(12) United States Patent
Zheng et al.

(10) Patent No.: US 9,930,366 B2
(45) Date of Patent: Mar. 27, 2018

(54) PIXEL LEVEL ADAPTIVE INTRA-SMOOTHING

(75) Inventors: Yunfei Zheng, San Diego, CA (US); Muhammed Zeyd Coban, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 13/267,762

(22) Filed: Oct. 6, 2011

(65) Prior Publication Data

US 2012/0195378 A1  Aug. 2, 2012

Related U.S. Application Data

(60) Provisional application No. 61/437,482, filed on Jan. 28, 2011, provisional application No. 61/507,459, filed on Jul. 13, 2011.

(51) Int. Cl.
*H04N 7/12* (2006.01)
*H04N 11/02* (2006.01)
(Continued)

(52) U.S. Cl.
CPC .......... *H04N 19/85* (2014.11); *H04N 19/105* (2014.11); *H04N 19/117* (2014.11);
(Continued)

(58) Field of Classification Search
CPC ....... H04N 19/117; H04N 19/82; H04N 19/80
See application file for complete search history.

(56) References Cited

U.S. PATENT DOCUMENTS 6,037,986 A    3/2000  Zhang et al.
6,539,060 B1 *  3/2003  Lee et al. ................. 375/240.29
(Continued)

FOREIGN PATENT DOCUMENTS

CN    101754015 A    6/2010
EP    2252063 A1    11/2010
(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.
(Continued)

*Primary Examiner* — Rebecca Volentine

(57) ABSTRACT

This disclosure describes intra-smoothing techniques for intra-coding of video data. In one example, a video encoder is configured to determine a plurality of prediction samples for intra-predictive coding of a block to be coded in a video frame, calculate a local statistic for a first prediction sample of the prediction samples, select a filter from a plurality of filters based on the local statistic, and apply the selected filter to the first prediction sample. The video encoder may also be configured to calculate at least one local statistic for each prediction sample of the prediction samples, select a filter from a plurality of different filters based on the at least one local statistic for each prediction sample, and apply each selected filter to the corresponding prediction sample to generate the filtered version of the prediction sample. Embodiments further include video decoders and method of decoding encoded video signals.

75 Claims, 10 Drawing Sheets

(51) Int. Cl.
- H04N 11/04 (2006.01)
- H04N 19/85 (2014.01)
- H04N 19/105 (2014.01)
- H04N 19/593 (2014.01)
- H04N 19/117 (2014.01)
- H04N 19/136 (2014.01)
- H04N 19/182 (2014.01)
- H04N 19/80 (2014.01)

(52) U.S. Cl.
CPC ......... *H04N 19/136* (2014.11); *H04N 19/182* (2014.11); *H04N 19/593* (2014.11); *H04N 19/80* (2014.11)

(56) References Cited

U.S. PATENT DOCUMENTS

| | | | |
|---|---|---|---|
| 2003/0206664 A1* | 11/2003 | Gomila et al. | 382/268 |
| 2005/0100237 A1* | 5/2005 | Kong | G06T 7/0081 382/261 |
| 2005/0243912 A1* | 11/2005 | Kwon et al. | 375/240.03 |
| 2005/0244063 A1* | 11/2005 | Kwon et al. | 382/233 |
| 2006/0233253 A1* | 10/2006 | Shi et al. | 375/240.16 |
| 2006/0245499 A1* | 11/2006 | Chiu et al. | 375/240.18 |
| 2007/0121731 A1 | 5/2007 | Tanizawa et al. | |
| 2007/0201564 A1* | 8/2007 | Joch et al. | 375/240.29 |
| 2007/0206871 A1* | 9/2007 | Jalil et al. | 382/233 |
| 2007/0253483 A1* | 11/2007 | Lee | H04N 19/176 375/240.12 |
| 2008/0002902 A1 | 1/2008 | Lin et al. | |
| 2008/0123754 A1 | 5/2008 | Ratakonda et al. | |
| 2010/0008430 A1* | 1/2010 | Karczewicz | H04N 19/46 375/240.25 |
| 2010/0027686 A1* | 2/2010 | Zuo | G06T 9/00 375/240.29 |
| 2010/0111431 A1 | 5/2010 | Gharavi-Alkhansari et al. | |
| 2010/0142844 A1* | 6/2010 | Pereira et al. | 382/261 |
| 2010/0284458 A1* | 11/2010 | Andersson et al. | 375/240.03 |
| 2011/0038415 A1* | 2/2011 | Min | H04N 19/115 375/240.12 |
| 2011/0058611 A1* | 3/2011 | Sugimoto et al. | 375/240.16 |
| 2012/0140821 A1* | 6/2012 | Drugeon et al. | 375/240.12 |
| 2012/0201311 A1* | 8/2012 | Sole et al. | 375/240.29 |
| 2013/0058421 A1* | 3/2013 | Zheng | H04N 19/117 375/240.25 |
| 2013/0101032 A1* | 4/2013 | Wittmann | H04N 19/00763 375/240.12 |

FOREIGN PATENT DOCUMENTS

| | | |
|---|---|---|
| EP | 2391129 A1 | 11/2011 |
| JP | 2007288785 A | 11/2007 |
| JP | 2010507335 A | 3/2010 |
| JP | 2010529802 A | 8/2010 |
| WO | 2008048489 A2 | 4/2008 |
| WO | 2008153300 A1 | 12/2008 |
| WO | 2009120040 A2 | 10/2009 |
| WO | 2010002214 A2 | 1/2010 |
| WO | WO2011043797 A2 | 4/2011 |
| WO | 2011132400 A1 | 10/2011 |
| WO | WO2011134641 A1 | 11/2011 |

OTHER PUBLICATIONS

Wiegand et al., "WD2: Working Draft 2 of High-Efficiency Video Coding," JCTVC-D503, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011,193 pp.
Bross et al., "WD4: Working Draft 4 of High-Efficiency Video Coding," 6th Meeting: JCTVC-F803_d2, Torino, IT, Jul. 14-22, 2011, 226 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
International Preliminary Report on Patentability from International application No. PCT/US2012/021747, dated Apr. 22, 2013, 11 pp.
International Search Report and Written Opinion from International application No. PCT/US2012/021747, dated May 8, 2012, 24 pp.
Reply to Written Opinion dated May 8, 2012, from International application No. PCT/US2012/021747, filed Nov. 28, 2012, 44 pp.
Second Written Opinion from International application No. PCT/US2012/021747, dated Jan. 17, 2013, 8 pp.
Response to Second Written Opinion dated Jan. 17, 2013, from International application No. PCT/US2012/021747, filed Mar. 15, 2013, 14 pp.
Anonymous, "Test Model under Consideration," Document: JTCVC-B205, 2nd Meeting: Geneva, CH, Jul. 21-28, 2010.
Bossen et al., "Video Coding Using a Simplified Block Structure and Advanced Coding Techniques," IEEE Transactions on Circuits and Systems for Video Technology, vol. 20, No. 12, Dec. 1, 2010, pp. 1667-1675.
Li et al., "Simplified Bilateral Intra Smoothing Filter," Document: JCTVC-F528, 6th Meeting: Torino, IT, Jul. 14-22, 2011.
Marpe et al., "H. 264/ MPEG4-AVC Fidelity Range Extensions: Tools, Profiles, Performance, and Application Areas," IEEE International Conference on Image Processing, Genova, Italy, Sep. 11-14, vol. 1, pp. 593-596.
Partial International Search Report—PCT/US2012/021747—ISA/EPO—Mar. 12, 2012.
Kong et al., "Edge Map Guided Adaptive Post-Filter for Blocking and Ringing Artifacts Removal," IEEE International Symposium on Circuits and Systems (ISCAS), vol. 3, pp. 929-932, May 2004.
Lai et al., "Adaptive filtering for cross-view prediction in multi-view video coding," Proc. SPIE 6508, 650814 (2007), 12 pp.
Winken et al., "Description of video coding technology proposal by Fraunhofer HHI," Joint Collaborative Team on Video Coding (JCT-VC) of ITU-T SG16 WP3 and ISO/IEC JTC1/SC29/WG11, 1st Meeting: Dresden, DE, Apr. 15-23, 2010, 44 pp.
McCann et al., "Samsung's Response to the Call for Proposals on Video Compression Technology," Joint Collaborative Team on Video Coding (JCT-VC) of ITU-T SG16 WP3 and ISO/IEC JTC1/SC29/WG11, 1st Meeting: Dresden, DE, Apr. 15-23, 2010, 42 pp.
Zheng et al., "Simplified Intra Smoothing," Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, 6 pp.
Zheng et al., "CE13: Mode Dependent Hybrid Intra Smoothing," Joint Collaborative Team on Video Coding (JCT-VC) of ITU-T SG16 WP3 and ISO/IEC JTC1/SC29/WG11 4th Meeting: Daegu, KR, Jan. 20-28, 2011, 5 pp.
English Translation of the Notice of Grounds for Rejection from counterpart Korean Patent Application No. 2013-7022818, dated Oct. 28, 2014, 4 pp.
Japanese Office Action from corresponding Japanese Application No. 2013-552016 dated Jan. 27, 2015 including translation (7 pages).
Yamamoto T., et al., "Analysis and improvement of differential coding of intra modes," 3rd Meting, Guangzhou, Oct. 7-15, 2010, Document: JCTVC-C176, 5 pp.
First Office Action from corresponding Japanese Application No. 2013-552016 dated Jul. 15, 2014 which includes an English translation (6 pages).
Davies, "BBC's Response to the Call for Proposals on Video Compression Technology," Joint Collaborative Team on Video Coding (JCT-VC) of ITU-T SG16 WP3 and ISO/IEC JTC1/SC29/WG11, May 23, 2011; Document: JCTVC-A125, Apr. 2010, 30 pp.
Amonou, et al., "Description of video coding technology proposal by France Telecom, NTT, NTT Docomo, Panasonic and Technicolor," Apr. 15-23, 2010; ITU-T SG16 WP3 and ISOIIEC JTCII5C29NVG11, Document JCTVC-A114, Dresden, DE, Feb. 23, 2012, 42 pp.

* cited by examiner

PIXEL LEVEL ADAPTIVE INTRA-SMOOTHING

CLAIM OF PRIORITY

This application relates to and claims priority to Provisional Application No. 61/437,482, filed Jan. 28, 2011, which is assigned to the assignee hereof and hereby expressly incorporated by reference herein.

This application also relates to and claims priority to Provisional Application No. 61/507,459, filed Jul. 13, 2011, which is assigned to the assignee hereof and hereby expressly incorporated by reference herein.

TECHNICAL FIELD

This disclosure relates to the field of video coding, e.g., encoding of video data.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as MPEG-2, MPEG-4, or H.264/MPEG-4, Part 10, Advanced Video Coding (AVC), to transmit and receive digital video more efficiently.

Video compression techniques perform spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to other reference frames.

SUMMARY

In general, this disclosure describes intra-smoothing techniques for supporting intra-coding of video data. In particular, in some examples, the techniques of this disclosure relate to coding and decoding video content using adaptive intra-smoothing (AIS) in which a filtering decision is made on a pixel-by-pixel basis. This disclosure also includes, in some examples, techniques for determining which of a plurality of possible smoothing filters to use for each prediction sample. In some examples, this disclosure also includes techniques for determining whether to use filtered or unfiltered prediction samples for each pixel of a coded block.

In one aspect, a method of processing video data comprises determining a plurality of prediction samples for intra-predictive coding of a block to be coded in a video frame and calculating a local statistic for a first prediction sample of the prediction samples. The method also comprises selecting a filter from a plurality of different filters based on the local statistic and applying the selected filter to the first prediction sample.

In another aspect, a device for encoding data comprises a video encoder configured to determine a plurality of prediction samples for intra-predictive coding of a block to be coded in a video frame, calculate a local statistic for a first prediction sample of the prediction samples, select a filter from a plurality of different filters based on the local statistic, and apply the selected filter to the first prediction sample.

In another aspect, a computer-readable medium comprises computer-readable storage medium having stored thereon instructions that, when executed, cause a processor of a video coding device to determine a plurality of prediction samples for intra-predictive coding of a block to be coded in a video frame and calculate a local statistic for a first prediction sample of the prediction samples. The instructions further cause the processor of the video coding device to select a filter from a plurality of different filters based on the local statistic and apply the selected filter to the first prediction sample.

In another aspect, a device is provided that comprises means for determining a plurality of prediction samples for intra-predictive coding of a block to be coded in a video frame and means for calculating a local statistic for a first prediction sample of the prediction samples. The device further comprises means for selecting a filter from a plurality of different filters based on the local statistic and means for applying the selected filter to the first prediction sample.

In yet another aspect, a method of encoding video data comprises calculating a local statistic for a pixel in a block to be coded, wherein the block forms at least a portion of a video frame. The method further comprises receiving prediction samples associated with the block. The method also comprises selecting between a filtered version of a prediction sample of the prediction samples and an unfiltered version of the prediction sample based on the local statistic. The method further comprises applying the selected version of the prediction sample to intra-predictively code the pixel.

In another aspect, a device for decoding data comprises a video decoder configured to calculate a local statistic for a pixel in a block to be coded, wherein the block forms at least a portion of a video frame, receive prediction samples associated with the block, select between a filtered version of a prediction sample of the prediction samples and an unfiltered version of the prediction sample based on the local statistic, and apply the selected version of the prediction sample to intra-predictively code the pixel.

In another aspect, a computer program product comprises a computer-readable storage medium having stored thereon instructions that, when executed, cause a processor of a video decoding device to calculate a local statistic for a pixel in a block to be coded, wherein the block forms at least a portion of a video frame and receive prediction samples associated with the block. The instructions further cause the video decoding device to select between a filtered version of a prediction sample of the prediction samples and an unfiltered version of the prediction sample based on the local statistic and apply the selected version of the prediction sample to intra-predictively code the pixel.

In another aspect, a device comprises means for calculating a local statistic for a pixel in a block to be coded, wherein the block forms at least a portion of a video frame and means for receiving prediction samples associated with the block. The device further comprises means for selecting between a filtered version of a prediction sample of the prediction samples and an unfiltered version of the prediction sample based on the local statistic. The device also comprises means for applying the selected version of the prediction sample to intra-predictively code the pixel.

In yet another aspect, a method of processing video data comprises receiving a coded block indicative of pixels of at least a portion of a video frame and determining prediction samples associated with the coded block. The method further comprises calculating a local statistic for a pixel in the portion of the video frame associated with the coded block and selecting between the prediction samples and a filtered version of the prediction samples based on the local statistic. The method further comprises applying the selected version of the prediction samples to decode the pixel.

In another aspect, a device for decoding data comprises a video decoder configured to receive a coded block indicative of pixels of at least a portion of a video frame, determine prediction samples associated with the coded block, calculate a local statistic for a pixel in the portion of the video frame associated with the coded block; select between the prediction samples and a filtered version of the prediction samples based on the local statistic, and apply the selected version of the prediction samples to decode the pixel.

In another aspect, a computer program product comprises a computer-readable storage medium having stored thereon instructions that, when executed, cause a processor of a video decoding device to receive a coded block indicative of pixels of at least a portion of a video frame, determine prediction samples associated with the coded block, calculate a local statistic for a pixel in the portion of the video frame associated with the coded block, select between the prediction samples and the filtered version of the prediction samples based on the local statistic, and apply the selected version of the prediction samples to decode the pixel.

In another aspect, a device comprises means for receiving a coded block indicative of pixels of at least a portion of a video frame, means for determining prediction samples associated with the coded block, means for calculating a local statistic for a pixel in the portion of the video frame associated with the coded block, means for selecting between the prediction samples and the filtered version of the prediction samples based on the local statistic, and means for applying the selected version of the prediction samples to decode the pixel.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor.

Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

This disclosure may also apply to electromagnetic signals carrying information. For example, an electromagnetic signal may comprise information relating to which filters are selected for filtering prediction samples or whether filtered or unfiltered prediction samples were used to predict a pixel in a coded block. In some examples, a signal may be generated from or transmitted by a device implementing the techniques described herein. In other examples, this disclosure may apply to signals that may be received at a device implementing the techniques described herein.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
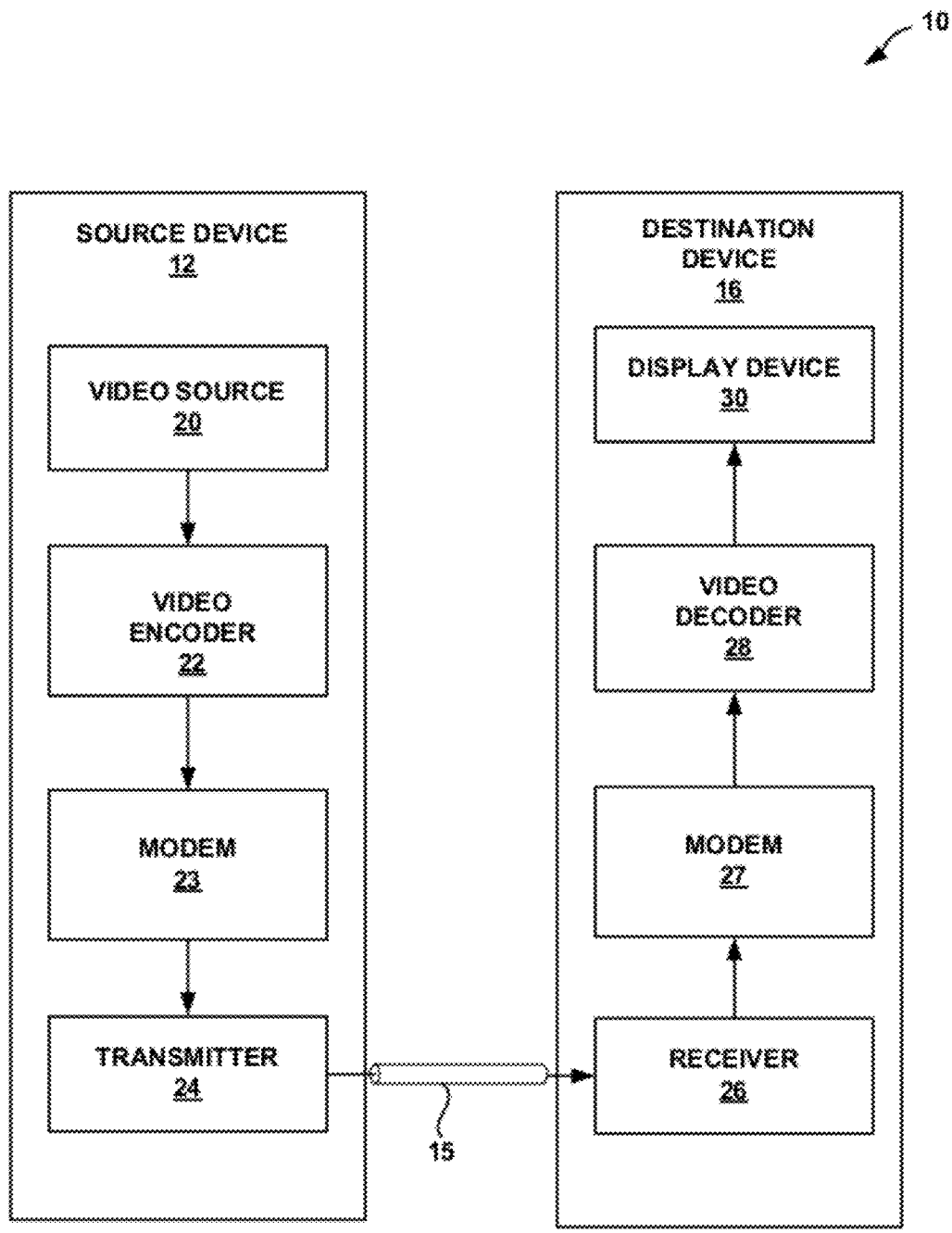
FIG. 1 is a block diagram illustrating one example of a video encoding and decoding system that may be used to implement one or more of the techniques of this disclosure.

Intra-prediction coding (or intra-coding) involves encoding a block of an image frame relative to blocks of the same frame. A block may be referred to as a prediction unit according to the high efficiency video coding (HEVC) standard currently under development by the Joint Collaborative Team on Video Coding (JCT-VC).

In this disclosure, the term "coding" may refer to either or both of encoding and/or decoding. The term "coder" may refer to a specialized computer device or apparatus that performs video encoding or video decoding. The term "coder" generally refers to any video encoder, video decoder, or combined encoder/decoder (codec). The terms "coded block," "coded block unit," or "coded unit" may refer to any independently decodable unit of a video frame such as an entire frame, a slice of a frame, a block of video data, or another independently decodable unit defined according to the coding techniques used. A "prediction unit" or "predictive block" may refer to a block of pixels that has been predicted from prediction samples. In contrast, a coded block may be an encoded block of residual coefficients that describe a difference between an actual block of an image frame and the predictive block of that image frame.

In some intra-coding modes, pixels in a block of a frame or slice to be coded are formed by directional extrapolation of surrounding pixels from neighboring blocks in the same frame or slice. The surrounding pixels from neighboring blocks form prediction samples for pixels in the intra-coded block. Accordingly, the terms "pixel," "predictor," and "prediction sample" may be used interchangeably in the context of pixels in one or more neighboring blocks used for prediction of pixels in a coded block. The prediction samples may be used to form the pixels of the coded block along a direction, e.g., vertical, horizontal or diagonal according to different modes. In a horizontal mode, for example, a pixel in a neighboring block at the left edge of the coded block may be used as the prediction sample for every pixel in the same row of the coded block.

For larger block sizes, the prediction accuracy of the pixels farther away from the neighboring prediction samples may be degraded, causing blocking artifacts. For example, in a horizontal mode, the prediction accuracy for pixels at the right-most edge of the coded block may be less than that of pixels closer to the prediction samples at the left edge of the coded block. To overcome possible degradation in intra-prediction coding, a smoothing filter may be applied to the surrounding prediction samples.

When more than one filter is available for use with an intra-smoothing technique, a decision may be made to determine which filter to use for an individual pixel in a set of prediction samples (the individual pixel referred to herein as a "prediction sample"). Prediction samples may be interchangeably referred to as reference samples. In order to determine which one of the filters to use to filter a prediction sample, one or more local statistics may be calculated for that prediction sample. Then, a filter is selected from the group of filters based on the values of the local statistics for that prediction sample. The filters may include any available filter, including both one-dimensional and two-dimensional filters. This method may result in a set of prediction samples in which different prediction samples are filtered by different filters.

Coded block units, also referred to simply as "coded blocks" in this disclosure, may correspond to macroblocks in video coding according to the ITU-T H.264/AVC (Advanced Video Coding) standard or coding units (CUs) in video coding according to the High Efficiency Video Coding (HEVC) standard presently under development. A coded block may include information relating to luminance (Y) or chrominance (Cb and Cr) components of the video frame. Luminance (brightness) and chrominance (color) components are collectively referred to as texture components. There may be separate coded blocks for luminance and chrominance components.

This disclosure proposes an AIS scheme in which a filtering decision may be made on a pixel-by-pixel basis. This disclosure may apply to a technique determining which of a plurality of possible smoothing filters to use for a given prediction sample. This disclosure may also apply to a technique determining whether to use filtered or unfiltered prediction samples for intra-coding of a given pixel of a coded block. These techniques may be applied to all or some reference samples in one or more reference blocks, and to all of some of the intra-coded pixels in the block to be coded.

Regarding making a filter decision for individual prediction samples when more than one filter is available for use with an intra-smoothing technique, a decision may be made to determine which filter to use for an individual pixel in a set of prediction samples (the individual pixel referred to herein as a "prediction sample"). In order to determine which of N filters to use to filter a prediction sample, one or more local statistics may be calculated for that prediction sample. Then, a filter may be selected from the group of N filters based the local statistic(s), e.g., the value(s) of the local statistics, for that prediction sample. The N filters may be any available filter, including both one-dimensional and two-dimensional filters. This method may result in a set of prediction samples in which different prediction samples, used for intra-coding of pixels in a block to be coded, are filtered by different filters.

In addition to generating filtered prediction samples using different filters, a given pixel may be intra-predicted on a selective basis using either filtered or unfiltered prediction samples. To determine whether to use filtered or unfiltered prediction samples for each pixel of a coded block, techniques of this disclosure may determine local statistics of each pixel. The local statistics may be obtained for pixels that are causal neighbors of the pixel being predicted, i.e., pixels that are decoded and available at the decoder prior to decoding of the predicted pixel. Based on the local statistics, the filtered or unfiltered prediction samples will be selected to predict the pixel.

FIG. 1 is a block diagram illustrating one example of a video encoding and decoding system 10 that may be used to implement one or more of the techniques of this disclosure. As shown in FIG. 1, system 10 includes a source device 12 that may transmit encoded video to a destination device 16 via a communication channel 15. Source device 12 and destination device 16 may comprise any of a wide range of devices. In some cases, either or both of source device 12 and destination device 16 may comprise wireless communication devices, such as wireless handsets, so-called cellular or satellite radiotelephones, or any wireless devices that can communicate video information over a communication channel 15, in which case communication channel 15 is wireless. The techniques of this disclosure, however, which concern intra-smoothing on a pixel-by-pixel basis, are not necessarily limited to wireless applications or settings. The techniques may also be useful in a wide range of other settings and devices, including devices that communicate via physical wires, optical fibers or other physical or wireless media. In addition, the encoding or decoding techniques may also be applied in a standalone device that does not necessarily communicate with any other device. For example, video decoder 28 may reside in a digital media player or other device and receive encoded video data via streaming, download or storage media. Hence, the depiction of a source device 12 and destination device 16 in communication with one another is provided for purposes of illustration of an example implementation, and should not be considered limiting as to the techniques described in this disclosure, which may be applicable to video coding in general in a variety of environments, applications or implementations In the example of FIG. 1, source device 12 may include a video source 20, video encoder 22, modulator/demodulator (modem) 23, and transmitter 24. Destination device 16 may include a receiver 26, modem 27, video decoder 28, and display device 30. In accordance with this disclosure, a video encoder, such as video encoder 22 of source device 12, may be configured to apply one or more of the techniques of this disclosure as part of a video encoding process. Similarly, a video decoder, such as video decoder 28 of destination device 16, may be configured to apply one or more of the techniques of this disclosure as part of a video decoding process.

Video encoder 22 may also apply transform, quantization, and entropy coding processes to further reduce the bit rate associated with communication of residual blocks. Transform techniques may comprise discrete cosine transforms (DCTs) or conceptually similar processes. Alternatively, wavelet transforms, integer transforms, or other types of transforms may be used. In a DCT process, as an example, a set of pixel values may be converted into transform coefficients, which may represent the energy of the pixel values in the frequency domain.

Video encoder 22 may also quantize the transform coefficients, which may generally involve a process that reduces the number of bits associated with the corresponding transform coefficient. Entropy coding may include one or more processes that collectively compress data for output to a bitstream, where the compressed data may include, for example, a sequence of coding modes, motion information, coded block patterns, and quantized transform coefficients. Examples of entropy coding include, but are not limited to, context adaptive variable length coding (CAVLC) and context adaptive binary arithmetic coding (CABAC).

A coded video block may be represented by prediction information that can be used to create or identify a predictive block, and a residual block of data that can be applied to the predictive block to recreate the original block. The prediction information may comprise one or more prediction samples that are used to predict a block of data. Using the prediction samples, video decoder 28 may be able to reconstruct the predictive blocks that were used to code the residual blocks. Thus, given a set of residual blocks and a set of prediction samples (and possibly some additional syntax elements), video decoder 28 can reconstruct a video frame that was originally encoded. Intra-coding based on adaptive intra-smoothing techniques can achieve relatively high amounts of compression without excessive data loss, because successive video frames or other types of coded units are often similar. An encoded video sequence may comprise blocks of residual data, an unfiltered version of prediction samples and a filtered version of the prediction samples, indications of intra-prediction modes for intra-prediction, indications of filters used, and possibly other data, such as types of syntax elements.

Video encoder 22 may utilize intra-prediction techniques to encode video blocks relative to neighboring, reference video blocks of a common frame or slice. In this manner, video encoder 22 may spatially predict the pixels of the blocks to be encoded. Video encoder 22 may be configured with a variety of intra-prediction modes, which generally correspond to various spatial prediction directions. Video encoder 22 may be configured to select an intra-prediction mode based on a luminance component of a block, and then reuse the intra-prediction mode to encode chrominance components of the block. Moreover, in accordance with the techniques of this disclosure, video encoder 22 may encode a block by selecting filters for reference samples on a pixel-by-pixel (sample-by-sample) basis regardless of the intra-prediction mode used to encode the block.

By selecting a filter from a set of filters to apply on an individual basis for the prediction samples, the accuracy of the block predicted with the prediction samples is improved. The selection of which filter to apply to a prediction sample may be based on local statistics of that prediction sample. Similarly, selecting whether to apply a filtered version of the prediction samples or an unfiltered version of the prediction samples on an individual pixel basis for the pixels in the block to be coded may improve the accuracy of the predicted block. The selection of which version of the prediction samples, i.e., the filtered or unfiltered version of the prediction samples, to apply to the pixel to be intra-coded may be based on local statistics of that pixel to be intra-coded. Each prediction sample is a pixel in a portion of an image frame. Each prediction sample has luminance (Y) and chrominance (Cr and Cb) values that are used to predict corresponding luminance and chrominance values for the pixel to be encoded. Y values for a pixel may be in a separate block from Cr and Cb values for that pixel.

Again, the illustrated system 10 of FIG. 1 is merely one example. The various techniques of this disclosure may be performed by any encoding device that supports block-based predictive encoding, or by any decoding device that supports block-based predictive decoding. Source device 12 and destination device 16 are merely examples of such coding devices in which source device 12 generates coded video data for transmission to destination device 16. In some cases, devices 12 and 16 may operate in a substantially symmetrical manner, such that each of devices 12 and 16 include video encoding and decoding components. Hence, system 10 may support one-way or two-way video transmission between video devices 12 and 16, e.g., for video streaming, video playback, video broadcasting, or video telephony. In other examples, a decoder may not communicate with another device. Instead, the decoder may access encoded video data on local media. In further examples, a decoder may be part of a device that receives video data by streaming or downloading from a device that is simply a server for previously encoded video data and does not necessarily include an encoder.

FIG. 1 illustrates the possibility of real-time video telephony. However, as mentioned above, techniques of the disclosure may also be used in applications including streaming, downloading, or direct access to media. Although source device 12 of system 10 is described as capable of transmitting encoded video to a destination device 16 via a communication channel 15, there may be no direct communication between video encoder 22 of source device 12 and video decoder 28 of destination device 16. In some examples, source device 12 may not even include video encoder 22. Further, the encoded data may be encoded any time (such as weeks, months, or years) before video decoder 28 accesses the data. In other examples, the encoded data may be accessed via download or live streaming from a server or via a local disk (e.g., digital versatile disc (DVD) or blu-ray disk). Hence, modem 23 may not be included in source device 12, and in some examples there may not be source device 12 with communication channel 15.

In some examples, video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and/or computer generated video. In some cases, if video source 20 is a video camera, source device 12 and destination device 16 may form so-called camera phones or video phones, or other mobile devices configured to manipulate video data, such as tablet computing devices. In each case, the captured, pre-captured or computer-generated video may be encoded by video encoder 22.

When video source 20 captures a digital still picture, video encoder 22 may be configured to encode the image as, for example, a Joint Photographic Experts Group (JPEG) image. When the image is a frame of video data, video encoder 22 may be configured to encode the image according to a video coding standard such as, for example Motion Picture Experts Group (MPEG), International Organization for Standardization (ISO)/International Electrotechnical Commission (IEC) MPEG-1 Visual, ISO/IEC MPEG-2 Visual, ISO/IEC MPEG-4 Visual, International Telecommunication Union (ITU) H.261, ITU-T H.262, ITU-T H.263, ITU-T H.264/MPEG-4, H.264 Advanced Video Coding (AVC), the upcoming High Efficiency Video Coding (HEVC) standard (also referred to as H.265), or other video encoding standards. Video encoder 22 passes coded video data associated with the frame of video data to transmitter 24. The coded video data may be transferred to receiver 26 in a bitstream including signaling information along with the coded video data.

The coded video data may be modulated by modem 23 according to a communication standard, e.g., such as code division multiple access (CDMA) or another communication standard, and transmitted to destination device 16 via transmitter 24 and communication channel 15. Modem 23 may include various mixers, filters, amplifiers or other components designed for signal modulation. Transmitter 24 may include circuits designed for transmitting data, including amplifiers, filters, and one or more antennas. In some examples, rather than transmitting over a communication channel, source device 12 stores encoded video data, including blocks having texture and depth components, onto a storage medium, such as a digital video disc (DVD), Blu-ray disc, flash drive, or the like.

Receiver 26 of destination device 16 receives information over communication channel 15, and modem 27 demodulates the information. Like transmitter 24, receiver 26 may include circuits designed for receiving data, including amplifiers, filters, and one or more antennas. In some instances, transmitter 24 and/or receiver 26 may be incorporated within a single transceiver component that includes both receive and transmit circuitry. Modem 27 may include various mixers, filters, amplifiers or other components designed for signal demodulation. In some instances, modems 23 and 27 may include components for performing both modulation and demodulation.

Again, the video encoding process performed by video encoder 22 may implement one or more of the techniques described herein during intra-prediction encoding, which may include filter selection and selection between a filtered version and an unfiltered version of one or more prediction samples. The video decoding process performed by video decoder 28 may also perform such techniques during a motion compensation stage of the decoding process.

Display device 30 displays the decoded video data to a user, and may comprise any of a variety of one or more display devices such as a cathode ray tube (CRT), a liquid crystal display (LCD), a plasma display, an organic light emitting diode (OLED) display, or another type of display device. In some examples, display device 30 corresponds to a device capable of three-dimensional playback. For example, display device 30 may comprise a stereoscopic display, which is used in conjunction with eyewear worn by a viewer. The eyewear may comprise active glasses, in which case display device 30 rapidly alternates between images of different views synchronously with alternate shuttering of lenses of the active glasses. Alternatively, the eyewear may comprise passive glasses, in which case display device 30 displays images from different views simultaneously, and the passive glasses may include polarized lenses that are generally polarized in orthogonal directions to filter between the different views.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16.

Video encoder 22 and video decoder 28 may operate according to a video compression standard, such as the ITU-T H.264 standard, alternatively described as MPEG-4, Part 10, Advanced Video Coding (AVC). Additional video compression standards that are based on the ITU H.264/AVC standard that may be used by video encoder 22 and video decoder 28 include the scalable video coding (SVC) standard, which is a scalable extension to the ITU H.264/AVC standard. Another standard according to which video encoder 22 and video decoder 28 may operate includes the multi-view video coding (MVC) standard, which is a multi-view extension to the ITU H.264/AVC standard. Video encoder 22 and video decoder 28 may also operate according to the High Efficiency Video Coding (HEVC) standard presently under development. The techniques of this disclosure, however, are not limited to any particular video coding standard.

In some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. When any or all of the techniques of this disclosure are implemented in software, an implementing device may further include hardware for storing and/or executing instructions for the software, e.g., a memory for storing the instructions and one or more processing units for executing the instructions. Each of video encoder 22 and video decoder 28 may be included in one or more encoders or decoders, either of which may be integrated as part of a combined codec that provides encoding and decoding capabilities in a respective mobile device, subscriber device, broadcast device, server, or the like.

A video sequence typically includes a series of video frames, also referred to as video pictures. Video encoder 22 operates on video blocks within individual video frames in order to encode the video data. The video blocks may have fixed or varying sizes, and may differ in size according to a specified coding standard. Each video frame includes a series of one or more slices. In the ITU-T H.264 standard, for example, each slice may include a series of macroblocks, which may be arranged into sub-blocks. The H.264 standard supports intra prediction in various block sizes for two dimensional (2D) video encoding, such as 16 by 16, 8 by 8, or 4 by 4 for luma components, and 8×8 for chroma components. Video blocks may comprise blocks of pixel data, or blocks of transformation coefficients, e.g., following a transformation process such as discrete cosine transform (DCT) or a conceptually similar transformation process.

Smaller video blocks can provide better resolution, and may be used for locations of a video frame that include high levels of detail. In general, macroblocks and the various sub-blocks may be considered to be video blocks. In addition, a slice may be considered to be a series of video blocks, such as macroblocks and/or sub-blocks. Each slice may be an independently decodable unit of a video frame. Alternatively, frames themselves may be decodable units, or other portions of a frame may be defined as decodable units.

To encode the video blocks video encoder 22 performs intra-prediction to generate one or more prediction blocks. Video encoder 22 subtracts the prediction blocks from the original video blocks to be encoded to generate residual blocks. Thus, the residual blocks may represent pixel-by-pixel differences between the blocks being coded and the prediction blocks. Video encoder 22 may perform a transform on the residual blocks to generate blocks of transform coefficients. Following intra-based predictive coding and transformation techniques, video encoder 22 may quantize the transform coefficients. Quantization generally refers to a process in which coefficients are quantized to possibly reduce the amount of data used to represent the coefficients. Following quantization, entropy coding may be performed according to an entropy coding methodology, such as context adaptive variable length coding (CAVLC) or context adaptive binary arithmetic coding (CABAC). Additional details of an encoding process performed by video encoder 22 are described below with respect to FIG. 2.

Efforts are currently in progress to develop a new video coding standard, currently referred to as High Efficiency Video Coding (HEVC). The upcoming standard is also referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-three intra-prediction encoding modes.

HM refers to a block of video data as a coding unit (CU). Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit (LCU) of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, prediction unit (PU), or transform unit (TU).

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). Following prediction using a PU, video encoder 22 may calculate a residual value for the portion of the CU corresponding to the PU. The residual value may be transformed, scanned, and quantized. A TU is not necessarily limited to the size of a PU. Thus, TUs may be larger or smaller than corresponding PUs for the same CU. In some examples, the maximum size of a TU may correspond to the size of the corresponding CU.

As noted above, intra-prediction includes predicting a PU or a TU of a current CU of a picture from previously coded CUs of the same picture. More specifically, video encoder 22 may intra-predict a current CU of a picture using a particular intra-prediction mode. An HM encoder may be configured with up to thirty-five intra-prediction modes. Therefore, to support a one-to-one mapping between intra-prediction modes and transforms, HM encoders and decoders would need to store 66 matrices for each supported transform size. Furthermore, the block sizes for which all thirty-five intra-prediction modes are supported may be relatively large blocks, e.g., 32×32 pixels, 64×64 pixels, or even larger.

In destination device 16, video decoder 28 receives the encoded video data. Video decoder 28 entropy decodes the received video data, such as coded block 8, according to an entropy coding methodology, such as CAVLC or CABAC, to obtain the quantized coefficients. Video decoder 28 applies inverse quantization (de-quantization) and inverse transform functions to reconstruct the residual block in the pixel domain. Video decoder 28 also generates a prediction block based on control information or syntax information (e.g., coding mode, motion vectors, syntax that defines filter coefficients and the like) included in the encoded video data. Video decoder 28 may calculate a sum of the prediction block and the reconstructed residual block to produce a reconstructed video block for display. Additional details of an example decoding process performed by video decoder 28 are described below with respect to FIG. 10.

Figure 2:
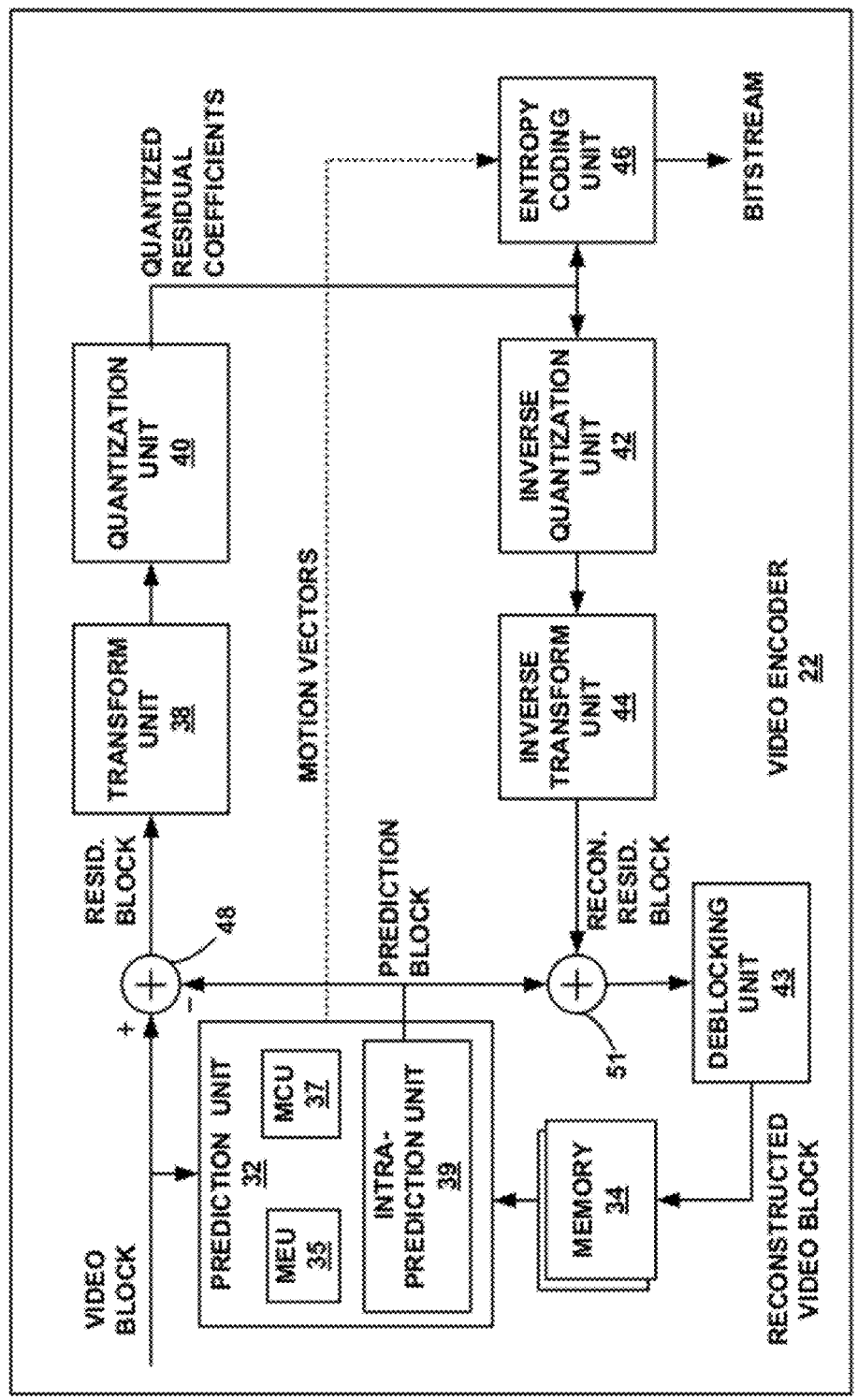
FIG. 2 is a block diagram illustrating an example of a video encoder in further detail.

FIG. 2 is a block diagram illustrating an example of the video encoder 22 of FIG. 1 in further detail. Video encoder 22 may filter prediction samples on a pixel-by-pixel basis by selecting a filter for each prediction sample based on local statistics of the prediction sample, consistent with the techniques of this disclosure. Video encoder 22 may also encode block units by determining, on a pixel-by-pixel basis, whether to predict the pixel with filtered or unfiltered prediction samples, i.e, reference pixels from reference blocks, consistent with the techniques of this disclosure. Video encoder 22 is one example of a specialized video computer device or apparatus referred to herein as a "coder." As shown in FIG. 2, video encoder 22 corresponds to video encoder 22 of source device 12. However, in other examples, video encoder 22 may correspond to a different device. In further examples, other units (such as, for example, other encoder/decoder (CODECS)) can also perform similar techniques to those performed by video encoder 22.

Video encoder 22 may perform intra- and inter-prediction of video blocks within video frames, including LCUs, CUs, and PUs, and calculate residual values that may be encoded as TUs. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes. Inter-modes such as unidirectional prediction (P-mode), bi-directional prediction (B-mode), or generalized P/B prediction (GPB-mode) may refer to any of several temporal-based compression modes. Motion estimation unit 42 and motion compensation unit 44 may perform inter-prediction coding, while intra-prediction unit 46 may perform intra-prediction coding.

As shown in FIG. 2, video encoder 22 receives a portion of an image within a video frame to be encoded. In the example of FIG. 2, video encoder 22 includes a prediction unit 32, memory 34, a first adder 48, a transform unit 38, a quantization unit 40, and an entropy coding unit 46. For video block reconstruction, video encoder 22 also includes an inverse quantization unit 42, an inverse transform unit 44, a second adder 51, and a deblocking unit 43. Deblocking unit 43 may be a deblocking filter that may filter block boundaries to remove blockiness artifacts from reconstructed video. If included in video encoder 22, deblocking unit 43 would typically filter the output of adder 51. In one example, as shown in FIG. 2, transform unit 38 may be a functional block, not a "TU" in terms of HEVC.

The prediction unit 32 comprises an intra-prediction unit 39, a motion estimation unit 35, and a motion compensation unit 37. During the encoding process, video encoder 22 receives a video frame or slice to be coded. The frame or slice may be divided into multiple video blocks or CUs. For example, during the encoding process, video encoder 22 receives a video block to be coded (labeled "VIDEO BLOCK" in FIG. 2). Motion estimation unit 35 and motion compensation unit 37 perform inter-predictive coding of the received video block relative to one or more blocks in one or more reference frames to provide temporal compression. Intra-prediction unit 39 may perform intra-predictive coding of the received video block relative to one or more neighboring blocks in the same frame or slice as the block to be coded to provide spatial compression.

During intra-prediction, intra prediction unit 39 may select an intra-prediction mode for the block. Some encoding standards define different prediction modes that may be used, wherein video encoder 22 selects one of the modes for encoding the video block. For example, the selected intra-prediction mode may be one of the 35 modes provided by the HM. However, techniques described herein may be applicable regardless of what intra-prediction mode has been used to encode the video block.

Prediction unit 32 performs intra-prediction coding to generate a prediction block (labeled "PREDICTION BLOCK" in FIG. 2). Intra predictive unit 39 may intra-predictively encode the current video block relative to neighboring blocks, e.g., blocks above, above and to the right, above and to the left, or to the left of the current block, assuming a left-to-right, top-to-bottom encoding order or blocks. At the decoder side, the neighboring reference blocks may be causal neighbors such that they are decoded prior to decoding of the block that is intra-coded using such reference blocks. Intra prediction unit 46 may utilize a neighboring block based on a selected intra-prediction mode for the current block.

Intra prediction unit 39 may determine the appropriate intra-prediction mode for the block, by selecting one of the available intra-prediction modes. Prediction modes may include functions for combining values of spatially neighboring pixels and applying the combined values to one or more pixel positions in a prediction unit (PU). Intra prediction unit 39 may signal the selected intra-prediction mode so that it is encoded with the syntax elements associated with the coded block.

During intra-prediction, prediction unit 39 determines which of a plurality of smoothing filters to apply to each prediction sample, i.e., each pixel in a set of pixels forming reference samples, based on local statistics of the prediction sample. That is, a smoothing filter may be selected from a candidate list of multiple, different smoothing filters based on properties of pixels surrounding the prediction sample. The number of different smoothing filters in the candidate set of smoothing filters may vary from one system to another. The smoothing filters in the candidate set may have different smoothing filter characteristics, e.g., to provide different degrees or types of smoothing. In some examples, the different smoothing filters may have different filter coefficients selected to provide different smoothing results. A smoothing filter may be selected for each prediction sample. In other examples, one smoothing filter may be used for all prediction samples. In one example, one of the smoothing filters is an all-pass filter (i.e. no filter operation).

Prediction unit 39 also determines which of the prediction samples or the filtered prediction samples to use to intra-predict each pixel in the coded video block. For example, buffers of filters prediction samples and unfilter prediction samples may be stored so that, for prediction of a given pixel in the coded video block, a filter or unfiltered prediction sample may be used on a selective basis. Video encoder 22 calculates local statistics for each pixel in the video block. The local statistics may be calculated for causal neighbors of the pixel at issue. Causal neighbors of a pixel may be pixels that have previously been encoded. In some examples, the causal neighbors of a pixel are adjacent to the pixel. Based on the local statistics, intra-prediction unit 39 selects between applying the filtered prediction samples or the unfiltered prediction samples to each pixel in the video block. The selection is based on which set of prediction samples yields the most accurate predicted pixel.

In examples where video encoder 22 performs inter-prediction, prediction unit 32 may include a motion estimation (ME) unit 35 and a motion compensation (MC) unit 37. One or more interpolation filters may be used by prediction unit 32 and may be invoked by one or both of ME unit 35 and MC unit 37 to perform interpolation as part of motion estimation and/or motion compensation, e.g., to provide motion estimation and motion compensation with integer pixel precision or fractional pixel precision, on a selective basis. ME unit 35 may perform motion estimation to identify a predictive block in memory 34, and MC unit 37 may perform motion compensation to generate the prediction block.

Motion estimation is typically considered the process of generating motion vectors, which estimate motion for video blocks. A motion vector, for example, may indicate the displacement of a prediction block within a prediction or reference frame (or other coded unit, e.g., slice) relative to the block to be coded within the current frame (or other coded unit). The motion vector may have full-integer or sub-integer pixel precision, as mentioned above. For example, both a horizontal component and a vertical component of the motion vector may have respective full integer components and sub-integer components. The reference frame (or portion of the frame) may be temporally located prior to or after the video frame (or portion of the video frame) to which the current video block belongs. Motion compensation is typically considered the process of fetching or generating the prediction block from memory 34, which may include interpolating or otherwise generating the predictive data based on the motion vector determined by motion estimation.

ME unit 35 calculates at least one motion vector for the video block to be coded by comparing the video block to reference blocks of one or more reference frames (e.g., a previous and/or subsequent frame). A prediction block may be selected based on a difference metric between the block to be coded and the prediction block, e.g., based on sum of absolute difference (SAD), or other difference metrics, so as to identify a prediction block that closely matches the block to be coded in terms of pixel content. Data for the reference frames may be stored in memory 34. ME unit 35 may perform motion estimation with full or fractional pixel precision. ME unit 35 may invoke one or more interpolation filters for any necessary interpolations during the motion estimation process. In some examples, memory 34 may store interpolated values for sub-integer pixels, which may be calculated by, e.g., summer 51 using an interpolation filter. For example, summer 51 may apply an interpolation filter to reconstructed blocks that are to be stored in memory 34. Once the motion vector for the video block to be coded is calculated by ME unit 35, MC unit 37 generates the prediction video block associated with that motion vector. MC unit 37 may fetch the prediction block from memory 34 based on the motion vector determined by MC unit 35.

Once prediction unit 32 has generated the prediction block, video encoder 22 forms a residual video block (labeled "RESID. BLOCK" in FIG. 2) by subtracting the prediction block from the original video block being coded. This subtraction may occur between texture components in the original video block that is coded and texture components in the prediction block, as well as for depth information in the original video block or depth map from depth information in the prediction block. Adder 48 represents the component or components that perform this subtraction operation. The result of adder 48 is a block of residual values indicating pixel differences between the block to be coded and the prediction block. The residual data may include residual luma and residual chroma blocks.

Transform unit 38 applies a transform, such as a discrete cosine transform (DCT) or a conceptually similar transform, to the residual block, producing a video block comprising residual transform block coefficients. It should be understood that transform unit 38 represents the component of video encoder 22 that applies a transform to residual coefficients of a block of video data, in contrast to a TU of a CU as defined by HEVC. Transform unit 38, for example, may perform other transforms, such as those defined by the H.264 standard, which are conceptually similar to DCT. Such transforms may include, for example, directional transforms (such as Karhunen-Loeve theorem transforms), wavelet transforms, integer transforms, sub-band transforms, or other types of transforms. In any case, transform unit 38 applies the transform to the residual block, producing a block of residual transform coefficients. Transform unit 38 may apply the same type of transform to both the texture components and, if applicable, the depth information in corresponding residual blocks. There will be separate residual blocks for each texture and depth component. The transform may convert the residual information from a pixel domain that provides pixel difference values to a frequency domain that provides transform coefficients.

Quantization unit 40 quantizes the residual transform coefficients to further reduce bit rate. The quantization process may reduce the bit depth associated with some or all of the coefficients. Quantization unit 40 may quantize a depth image coding residue. Following quantization, entropy coding unit 46 entropy codes the quantized transform coefficients. For example, entropy coding unit 46 may perform CAVLC, CABAC, or another entropy coding methodology.

Entropy coding unit 46 may also code one or more motion vectors and support information obtained from prediction unit 32 or other component of video encoder 22, such as quantization unit 40. The one or more prediction syntax elements may include a coding mode, data for one or more motion vectors (e.g., horizontal and vertical components, reference list identifiers, list indexes, and/or motion vector resolution signaling information), an indication of a used interpolation technique, a set of filter coefficients, deblocking information, or other information associated with the generation of the prediction block. These prediction syntax elements may be provided in the sequence level or in the picture level.

Inverse quantization unit 42 and inverse transform unit 44 apply inverse quantization and inverse transformation, respectively, to reconstruct the residual block in the pixel domain, e.g., for later use as a reference block. The reconstructed residual block (labeled "RECON. RESID. BLOCK" in FIG. 2) may represent a reconstructed version of the residual block provided to transform unit 38. The reconstructed residual block may differ from the residual block generated by summer 48 due to loss of detail caused by the quantization and inverse quantization operations. Summer 51 adds the reconstructed residual block to the motion compensated prediction block produced by prediction unit 32 to produce a reconstructed video block for storage in memory 34. The reconstructed video block may be used by prediction unit 32 as a reference block that may be used to subsequently code a block.

In this manner, video encoder 22 represents an example of a video encoder configured to determine a plurality of prediction samples for intra-predictive coding from at least a portion of a video frame, calculate one or more local statistics for a first prediction sample of the prediction samples, select a filter from a plurality of filters based on the one or more local statistics, and apply the selected filter to the first prediction sample. Video encoder 22 may also be configured to calculate at least one local statistic for each prediction sample of the prediction samples, select a filter from a plurality of filters based on the at least one local statistic for each prediction sample, and apply each selected filter to the corresponding prediction sample to generate the filtered version of the prediction sample.

Figure 3:
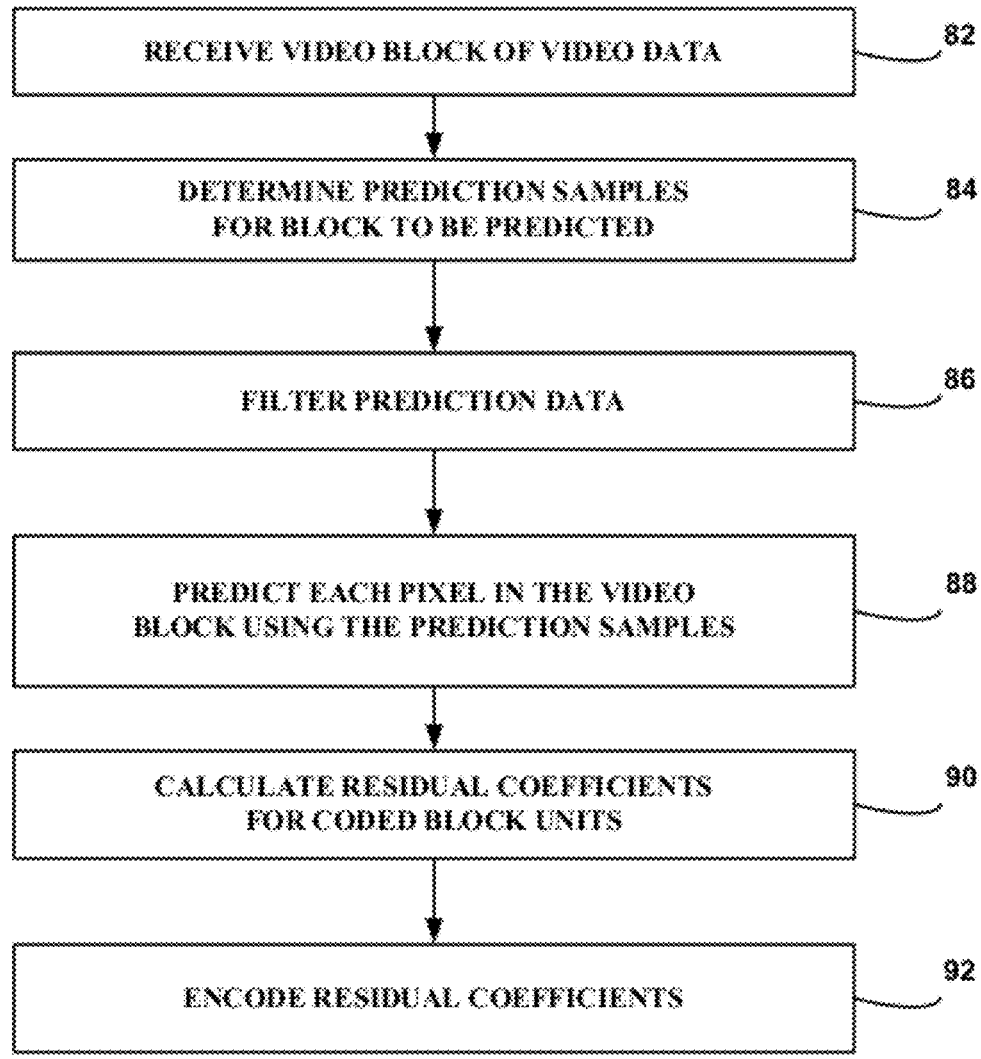
FIG. 3 is a conceptual diagram illustrating an example of prediction samples of a video block to be predicted that may be filtered according to techniques of this disclosure.

FIG. 3 is a flow diagram illustrating an example operation of a video encoder according to techniques of this disclosure. The technique of FIG. 3 will be described from the perspective of video encoder 22 of FIG. 2, although other devices may perform similar techniques.

Video encoder 22 may obtain a frame or block of video data (82). A video frame or video block may be at least a portion of an image. Video encoder 22 determines prediction samples for the video block to be predicted (84). The prediction samples may be those pixels in a left pixel array, e.g., to the left of the block to be coded, and an upper pixel array, e.g., above the block to be coded. The left pixel array may be a column of pixels forming reference samples, where each pixel in the left pixel array may be used as a reference sample to predict pixels in a corresponding row of the block to be coded. The upper pixel array may be a row of pixels forming reference samples, where each pixel in the upper pixel array may be used as a reference sample to predict pixels in a corresponding column of the block to be coded.

In some examples, the upper pixel array may be coextensive with the width (number of pixels in a row) of the block to be coded, and the left pixel array may be coextensive with the height (number of pixels in a column) of the block to be coded. In other examples, the upper pixel array may be an upper extended pixel array adjacent to the video block including pixels that are coextensive with the width of the coded block and additional pixels that extend beyond the width (e.g., to the left or right) of the coded block, e.g., for use in diagonal prediction. Similarly, in some examples, the left pixel array may be a left extended pixel array adjacent to the video block including pixels that are coextensive with the height of the coded block and additional pixels that extend beyond the height (e.g., extending above or below) of the coded block, e.g., for use in diagonal prediction.

Video encoder 22 may filter the prediction samples (86). The prediction samples are filtered on an individual pixel basis based on local statistics of the reference sample. For example, one of a plurality of different filters may be selected for each individual pixel forming a reference sample based on one or more local statistic of the reference sample. Selection of different filters, as described in this disclosure, may refer to selection of different preconfigured filters defined by filter characteristics stored in memory, modification of characteristics of existing filters, combinations of different filters, or other techniques for selectively applying different filter characteristics to a reference sample. How the prediction samples may be filtered is described in further detail with respect to FIGS. 4 and 5.

Once the prediction samples are filtered, video encoder 22 predicts each pixel in the video block with the prediction samples (88). The pixels may be predicted on an individual basis using either the filtered prediction samples or the unfiltered prediction samples, based on local statistics. How the pixels in the block to be predicted may be predicted is described in further detail with respect to FIGS. 6 and 7.

Video encoder 22 may calculate residual coefficients for the coded blocks (90). Video encoder 22 may then encode the residual coefficients (92). The encoded residual coefficients may be transmitted to a decoder device (such as decoder 28) in an encoded bitstream.

Figure 4:
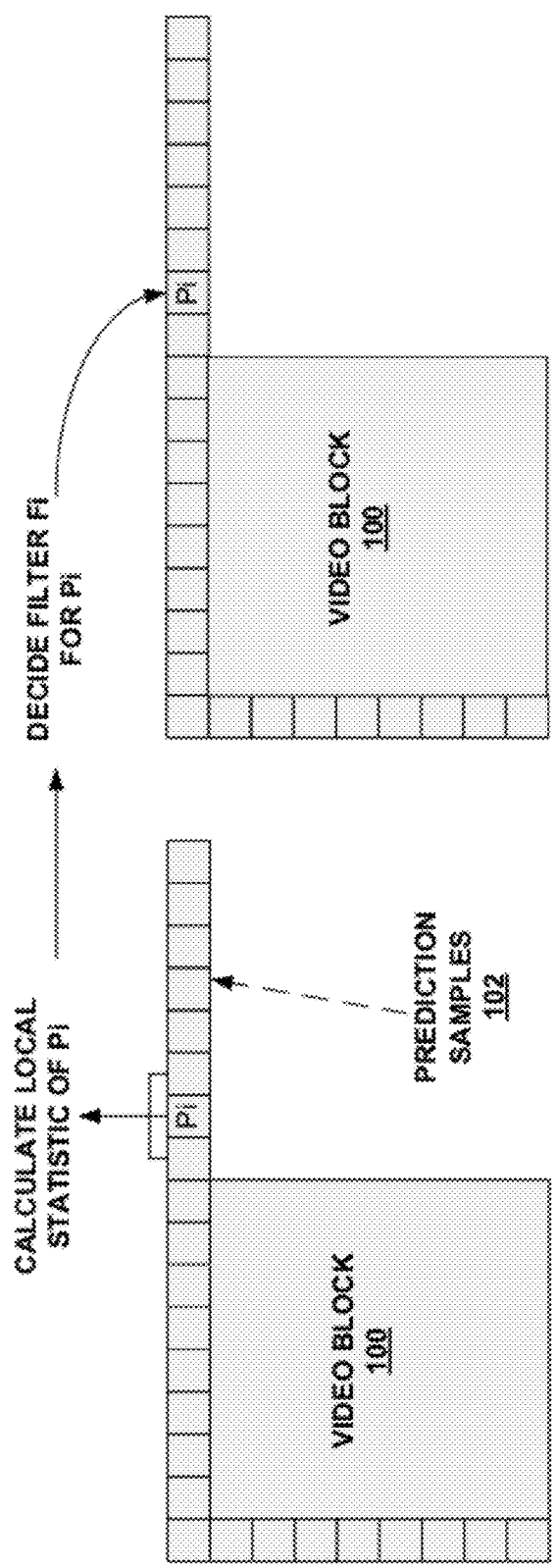
FIG. 4 is a flow diagram illustrating an example operation of a video encoder according to techniques of this disclosure.

FIG. 4 is a conceptual diagram illustrating an example of prediction samples 102 of a video block 100 to be predicted that may be filtered according to techniques of this disclosure. Prediction samples 102 include pixels P0 through Pn, wherein a given pixel is shown in FIG. 4 as pixel Pi. As shown in the example of FIG. 4, the prediction samples include a left pixel array and an upper extended pixel array of the video block 100. In other examples, a basic (non-extended) upper pixel array or an extended left pixel array may be used. The pixels in the prediction samples may have been previously encoded.

FIG. 4 illustrates an example of applying adaptive intra-smoothing on a pixel-by-pixel basis to a prediction sample Pi. FIG. 4 shows an 8×8 pixel video block 100 for purposes of illustration. However, smaller or larger blocks may be used as prediction units for intra-coding, according to various intra-coding modes that may be selected to predict a block. Techniques described in this disclosure may be used to select a smoothing filter among a set of a plurality of different smoothing filters to apply to the pixel Pi. The choice of the filter is based on at least one local statistic of the pixel Pi.

A local statistic may be calculated for a pixel. A local statistic of a pixel is a measure of a property of the pixel or at least one other pixel neighboring the pixel, and in some cases two or more neighboring pixels. In some examples, a local statistic of a pixel is determined for adjacent pixels preceding the pixel in a coding sequence. Such neighboring pixels preceding the pixel in the coding sequence may be referred to as casual neighbors of the pixel, as they are decoded and available to the decoder at the time the pixel is to be filtered. The local statistic may be calculated for one or more pixels. In some examples where multiple pixels are used, the local statistic may be averaged, including a weighted average.

A local statistic may include intensity, position, local gradient, variance, or the like. Intensity relates to the brightness of a pixel. The intensity or position may refer to the intensity or position of the pixel to be filtered in the array of reference samples. The gradient or variance may refer to the gradient or variance in a neighborhood of pixels including the pixel and one or more adjacent pixels in the array of reference samples. For example, a local statistic based on position may be the position of a pixel within a set of prediction samples or in a video block to be coded. A local gradient may be a difference in a parameter (e.g., intensity) of a pixel and an adjacent pixel. For example, a gradient may be a difference between a prediction sample and an adjacent prediction sample to the left or right. A variance may be calculated in a variety of ways, such as by calculation of a mean square error (MSE) of two or more adjacent pixels in the array of prediction samples. For example, the mean square error may calculate the sum of the square of a gradient of a property. For example, a variance based on a gradient of intensity, I, may be defined as $[(I_p-I_{lp})^2+(I_p-I_{rp})^2]^{1/2}$, where $I_p$ is the intensity of the prediction sample or pixel at issue and $I_{lp}$ is the intensity of a prediction sample or pixel to the left of the prediction sample or pixel at issue. Variances may be calculated using other properties. Furthermore, any other local statistic may be used.

Based on the local statistic, a filter may be chosen to apply to the pixel. For example, if the local statistic of Pi is intensity, a filter may be chosen, for example, based on its appropriateness for a relatively dark or bright pixel. Similarly, a filter may be chosen based on the position of a pixel within an array of prediction samples, e.g., the position in a left, top or extended array of pixels forming prediction samples. Regarding variance as the local statistic, for example, if the variance shows a relatively larger gradient than average (such as along an edge of an object in the video frame), a filter appropriate for this situation may be selected. Similarly, an appropriate filter may be selected for a variance showing a small difference in the property between the pixels. In some examples, such local statistics may be used to select a filter based on a predefined mapping of statistics to different filters, a function that is used to generate a value that maps to different filters, a function that is used to modify one or more characteristics of filters, or in other ways to support selection and use of different filters for a given reference sample based on local statistics for the reference sample. The filtered or unfiltered reference samples may be used to predict the values of pixels in video block 100 to be coded.

As shown in FIG. 4, a local statistic is calculated for pixel Pi. Local statistics for selection of a smoothing filter to filter a prediction sample may include intensity, position, local gradient, variance, or the like. For example, the local statistic, variance, is calculated for Pi. Based on a value of the variance, a filter Fi is chosen from N filters. Fi is applied to Pi to generate a filtered prediction sample Pi. The rest of the prediction samples in the set of prediction samples may be processed in a similar way. A local statistic may be calculated for each pixel in the set of prediction samples. Thus, a filter may be selected on an individual basis for each prediction sample based on at least one local statistic of the prediction sample. Once all prediction samples are processed, they can be used to predict the predicting block. Again, rather than variance, other local statistics or combinations of such statistics may be used. In particular, in some examples, a single local statistic may be used or multiple local statistics may be used for selection or generation of one of a plurality of different filters.

Using the selected filters for each prediction sample in the original array of unfiltered prediction samples, an array of filtered prediction samples may be generated. Hence, arrays of filtered and unfiltered prediction samples may be buffered in the decoder, for example, video decoder 28 of FIG. 1. The arrays of filtered and unfiltered prediction samples may be made available for use in predicting each pixel in the block to be predicted 100. The decoder, such as video decoder 28, may apply similar statistics-based rules to reproduce the filtered set of prediction samples. Thus, in some examples, a bitstream received by decoder 28 may not signal which filters were selected for the prediction samples.

Each prediction sample may be filtered on an individual basis according to an encoding order. For example, the first prediction sample to be filtered may be the upper left prediction sample. The next prediction sample to be filtered may be the next adjacent prediction sample on the same horizontal level as the previous prediction sample. In other examples, the next prediction sample in a raster order is the next prediction sample filtered. In some examples, the local statistic may be a one-dimensional statistic of adjacent pixels in the left array or top array. In another example, the local statistic may be of pixels that are adjacent pixels but are not in the left or top array. For example, the local statistics may be of pixels in the next column to the left or in the next row above the left or top array, respectively.

An intra-smoothing filter may be a pixel mask that is applied. The filter may be, for example, a one- or two-dimensional filter. In some examples, multiple intra-smoothing filters are available for filtering the prediction samples. Examples include 3 tap filters having coefficients such as 1-2-1 and 5-9-5. Another example includes a 3 dimensional filter. Also, some examples have different filters available for different arrays of prediction samples. One filter is chosen based on a local statistic of the prediction sample. Once a prediction sample is filtered, the value of the filtered prediction sample may be placed into a mode prediction samples buffer. This may be repeated for each of the prediction samples.

Figure 5:
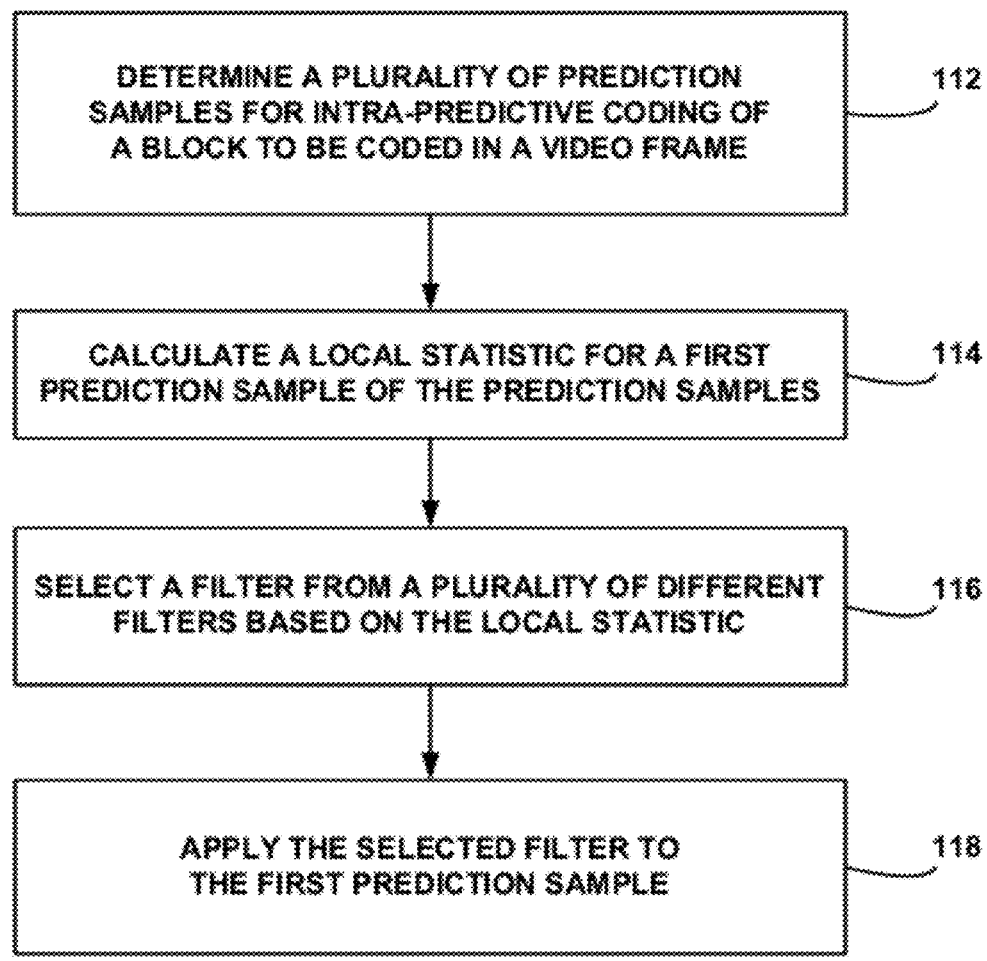
FIG. 5 is a flow diagram illustrating an example operation of a video encoder that selects a smoothing filter for a prediction sample according to techniques of this disclosure.

FIG. 5 is a flow diagram illustrating an example operation of a video encoder that selects a smoothing filter for a prediction sample according to techniques of this disclosure. The technique of FIG. 5 will be described from the perspective of video encoder 22 of FIG. 2, although other devices may perform similar techniques. The technique of FIG. 5 may correspond to determining prediction samples (84) and filtering prediction samples (86) shown in FIG. 3.

Video encoder 22 determines a plurality of prediction samples for intra-predictive coding from at least a portion of a video frame (112). The prediction samples may include a left pixel array and a basic or extended upper pixel array, as shown in FIG. 4. In other examples, other sets of prediction samples are used.

For a prediction sample of the set of prediction samples, a local statistic for that prediction sample is calculated (114). As discussed above, the local statistic may be calculated for one or more neighbors of the prediction sample. The local statistic may also be one or more of a variance, position, a local gradient, or an intensity value. In some examples, the local statistic may be based on a region of pixels around the prediction sample.

Based on the local statistic, a filter is selected by encoder 22 from a plurality of filters (116). The filter may be selected because it is most suitable or equally suitable for the value of the local statistic than the other filters. The selected filter may be applied to the prediction sample (118). This process may be repeated for each prediction sample in the set of prediction samples.

In other examples, a filter is selected for one prediction sample based on local statistics of that sample. The selected filter may be applied to every prediction sample in the set of prediction samples.

In another example, a threshold value may be determined for a local statistic. Filters may be selected from the plurality of filters based on comparing the value of the local statistic to the threshold value. For example, if the local statistic is below the threshold value, one filter may be chosen. The filter may be appropriate for filtering prediction samples with local statistics in a range of values below the threshold value. If the local statistic is equal to or greater than the threshold value, a different filter may be chosen.

In some examples, multiple threshold levels may be assigned to one or more local statistics. Each filter in the plurality of filters may be assigned to a range within the threshold levels, such that a filter is chosen based on whether it is between two or more threshold levels. The filters may be assigned to the threshold levels based on how appropriate the filters are in filtering the prediction samples over that range of local statistic values. In some examples, a function may be used to select a filter. The input of the function may be one or more local statistics. The output of the function may be the selection of a filter from the plurality of filters.

Figure 6:
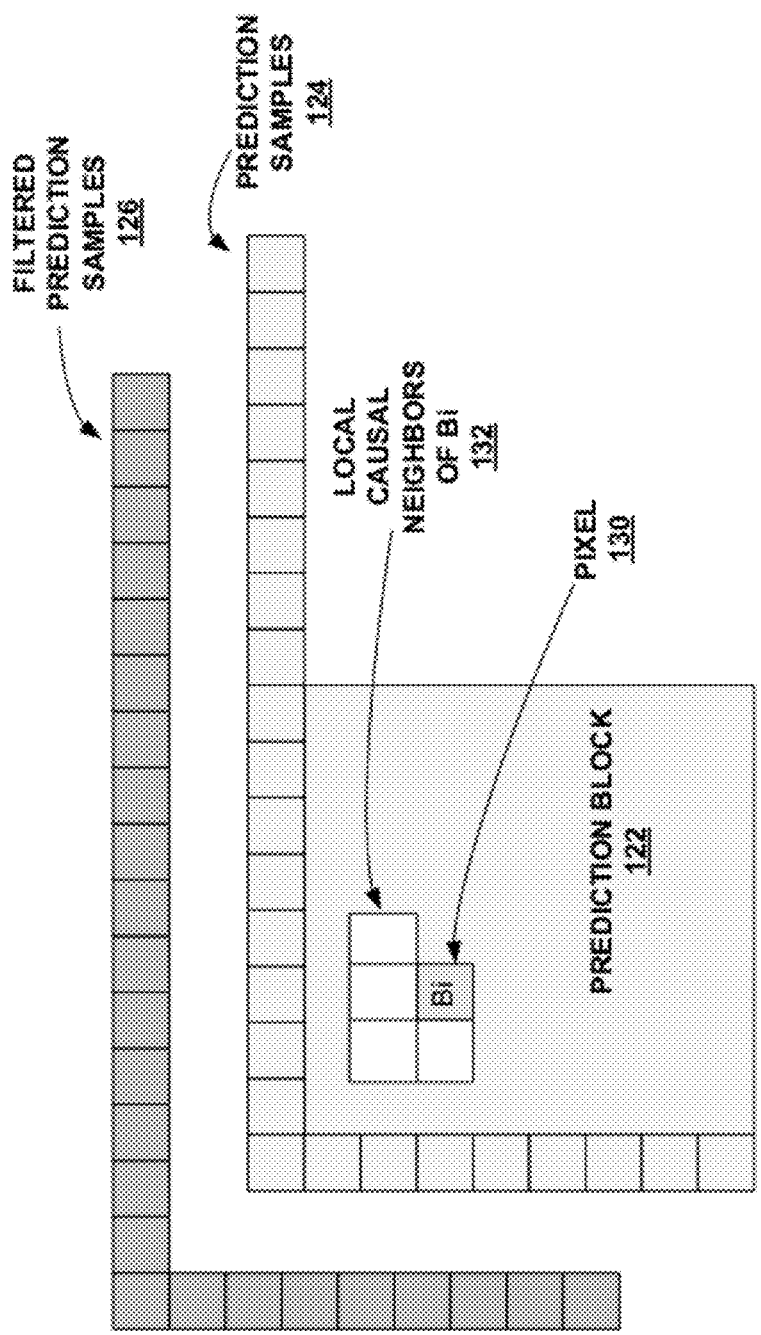
FIG. 6 is a conceptual diagram illustrating an example of a pixel in a video block to be predicted that may be predicted using a filtered or an unfiltered set of prediction samples on a selective basis according to techniques of this disclosure.

FIG. 6 is a conceptual diagram illustrating an example of a pixel Bi 120 in a video block to be predicted 122 that may be predicted using a filtered set of prediction samples 126 or an unfiltered set of prediction samples 124 on a selective basis according to techniques of this disclosure. Filtered prediction samples 126 may have been filtered according to techniques described herein. In other examples, filtered prediction samples 126 may have been filtered using other techniques. In some examples, unfiltered and filtered versions of the prediction samples 126 may be generated and maintained in one or more memory buffers.

A decision may be made whether to use filtered or unfiltered prediction samples for each pixel of prediction block 122. For each pixel in the prediction block 122, the decision whether to use filtered or unfiltered prediction samples may be based on at least one local statistic associated with the pixel. The at least one local statistic may be of a local causal neighbor to the pixel. A local causal neighbor may be any pixel processed earlier in a raster processing than the predicted pixel.

As shown in FIG. 6, prediction block 122 comprises pixel (Bi) 130, which is to be predicted. Pixel 130 has local causal neighbors 132. Local causal neighbors 132 are pixels that precede pixel 130 in a raster processing. In some examples, local statistics are not calculated for local causal neighbors 132 of pixel 130. As discussed above, a local statistic may include intensity, position, local gradient, variance, or the like, or other local statistics useful in selecting different filters.

The local causal neighbors 132 are shown as those adjacent pixels above and to the left of pixel 130. Any number of local causal neighbors or local statistics may be used. Local causal neighbors 1323 may also be predicted in time before pixel 130 is predicted. The decision to use the filtered version or unfiltered version of the prediction samples is based on at least one local statistic of at least one causal neighbor 130 of pixel 130.

For each pixel in prediction block 122, a decision may be made, e.g., by decoder 28, whether to use filtered prediction samples 126 or unfiltered prediction samples 124 for pixels of prediction block 122. For each pixel in prediction block 122, the decision whether to use filtered prediction samples 126 or unfiltered prediction samples 124 may be based on at least one local statistic of the pixel. For example, one of filtered prediction samples 126 or unfiltered prediction samples 124 is selected based on one or more local statistics of local causal neighbors 132 of pixel 130 being predicted. Based on the one or more local statistics, filtered prediction samples 126 or unfiltered prediction samples 124 are selected to apply to predict pixel 130 based on which set will yield better accuracy for predicting pixel 130.

For example, if the local statistic for the pixel is position, the version of the prediction samples may be determined based on how accurate the filtered or unfiltered prediction samples are compared with the location of the pixel. For example, if pixel 130 is very close to the upper left of prediction block 122, the unfiltered prediction samples may be used because they are more likely to be accurate the closer pixel 130 is to the prediction samples 124. If pixel 130 were close to the bottom right of prediction block 122, filtered prediction samples 126 may be used because it is more likely that pixel 130 will differ from prediction samples 124. There may be, for example, a higher correlation to the unfiltered prediction samples 124 to the upper left of prediction block 122 such that the further a pixel is from the upper left, the less correlated the pixel may be with the prediction samples.

Figure 7:
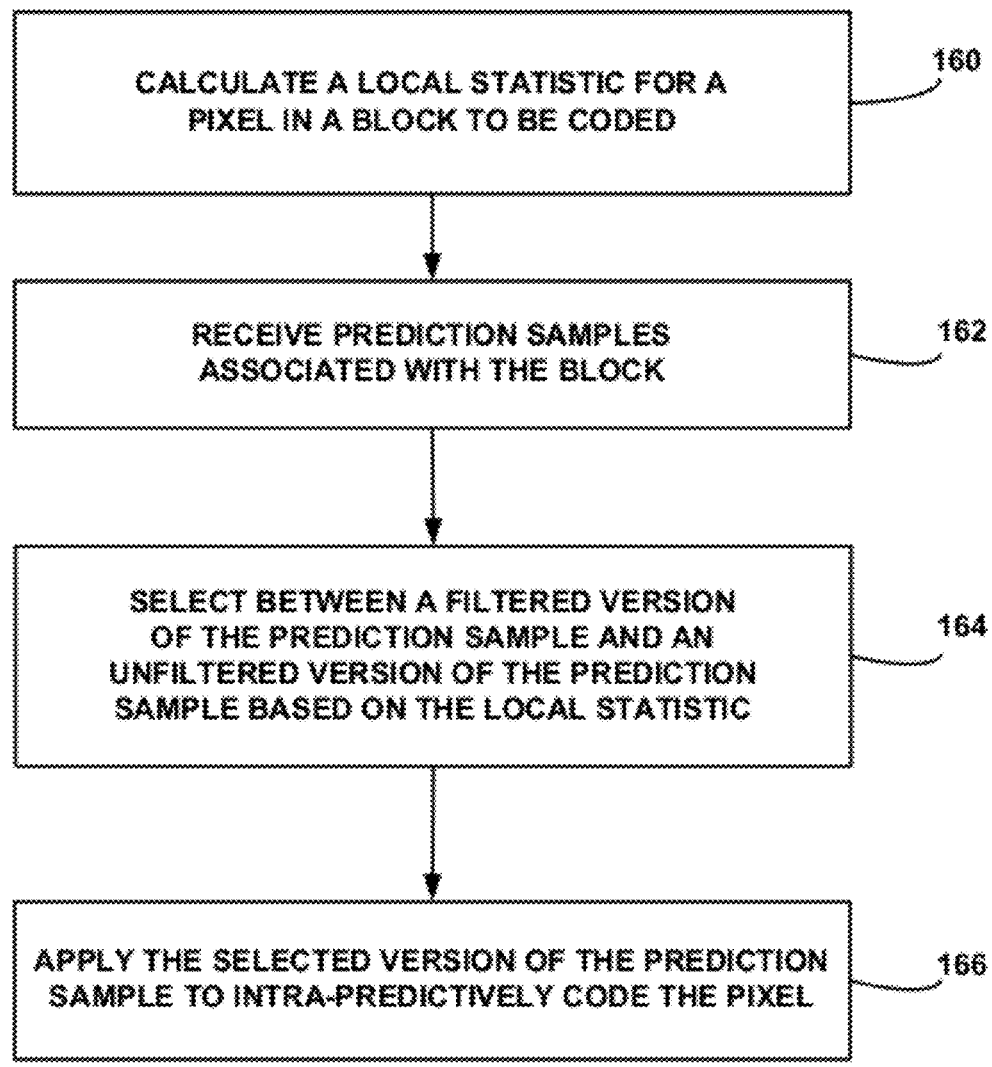
FIG. 7 is a flow diagram illustrating an example operation of a video encoder that selects between a filtered and an unfiltered set of prediction samples for predicting a pixel in a block to be encoded according to techniques of this disclosure.

FIG. 7 is a flow diagram illustrating an example operation of a video encoder that selects between a filtered and an unfiltered set of prediction samples for predicting a pixel in a block to be encoded according to techniques of this disclosure. The technique of FIG. 7 will be described from the perspective of video encoder 22 of FIG. 2, although other devices may perform similar techniques. The technique of FIG. 7 may correspond to predicting each pixel in the video block using the prediction samples (88) shown in FIG. 3.

Video encoder 22 calculates a local statistic for a pixel in a block to be coded, wherein the block forms at least a portion of a video frame (160). The local statistic may be calculated for at least one local causal neighbor of the pixel. The local causal neighbors of the pixel in the block to be coded may be one or more pixels adjacent to the pixel to be predicted.

Prediction samples associated with the block may be received by video encoder 22 (162). The video encoder 22 may filter the prediction samples. Filtering the prediction samples may be performed according to techniques described in this disclosure. The unfiltered prediction samples and the filtered prediction samples may be stored in a buffer or memory, such as memory 34. Video encoder 22 selects between a filtered version of a prediction sample of the prediction samples and an unfiltered version of the prediction sample based on the local statistic of the at least one local causal neighbor of the pixel (164). The filtered version or unfiltered version of the prediction samples may be selected to predict a pixel in the prediction block based on which version of prediction samples is most accurate in predicting the pixel. The selected version of the prediction sample is applied to the pixel to intra-predictively code the pixel (166).

In another example, a threshold value may be determined for a local statistic for the pixels. The filtered or unfiltered version of the prediction samples may be selected based on comparing the value of the local statistic to the threshold value. For example, if the local statistic is below the threshold value, the unfiltered version may be chosen. The unfiltered version of the prediction samples may be more accurate for predicting pixels with local statistics in a range of values of the local statistic below the threshold value. If the local statistic is equal to or greater than the threshold value, the filtered version of the prediction samples may be selected. Different threshold values may be set for different types of local statistics. In such a manner, an encoding device, such as video encoder 22, may produce an intra-predictive block and a decoding device, such as video decoder 28, may reproduce approximately the same predictive block using similar techniques in an inverse manner. The encoder sends the residual block so that the decoder can reproduce the original block that was coded by adding the residual to the predictive block.

Figure 8:
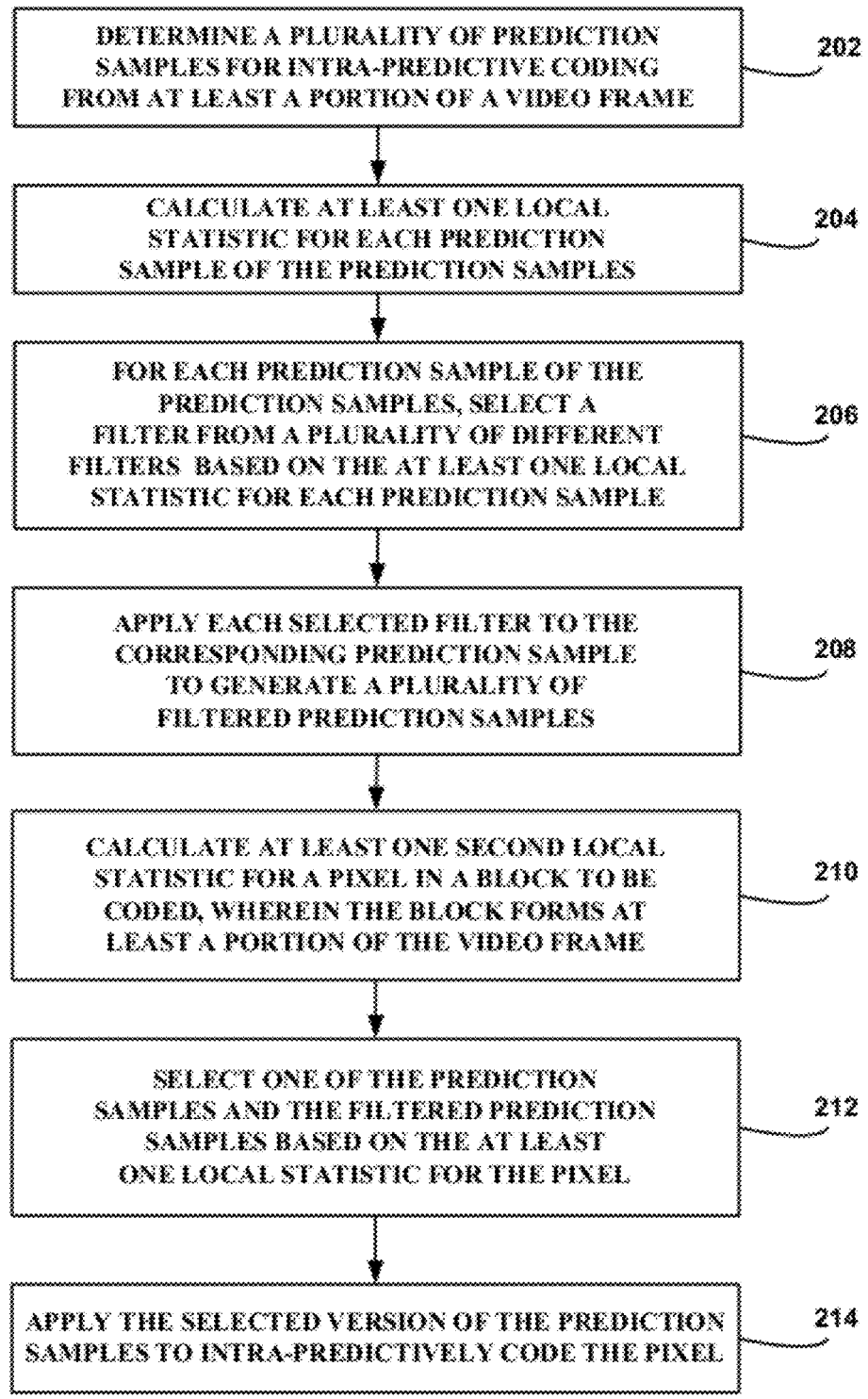
FIG. 8 is a flow diagram illustrating an example operation of a video decoder that performs adaptive intra-smoothing to a block to be encoded based on local statistics according to techniques of this disclosure.

FIG. 8 is a flow diagram illustrating an example operation of a video decoder that performs adaptive intra-smoothing to a block to be encoded based on local statistics according to techniques of this disclosure. The technique of FIG. 8 will be described from the perspective of video encoder 22 of FIG. 2, although other devices may perform similar techniques. The technique of FIG. 8 may correspond to a combination of the techniques of FIGS. 5 and 7.

Video encoder 22 may determine a plurality of prediction samples for intra-predictive coding from at least a portion of a video frame (202). At least one local statistic for each prediction sample of the prediction samples may be calculated by encoder 22 (204). For each prediction sample of the prediction samples, video encoder 22 may select a filter from a plurality of filters based on the at least one local statistic for each prediction sample (206). Each selected filter may be applied to the corresponding prediction sample to generate a plurality of filtered prediction samples (208). The unfiltered prediction samples and the filtered prediction samples may be stored or transmitted to video decoder 28.

At least one second local statistic for a pixel in a block to be coded forming at least a portion of the video frame may be calculated (210). If more than one second local statistic is calculated, they may be combined, such as through averaging or a weighted average. The second local statistic may be of a causal neighbor of the predicted pixel.

One of the prediction samples and the filtered prediction samples based on the at least one local statistic for the pixel is selected, for example, by video encoder 22, for predicting the pixel (212). The selected version of the prediction samples may be applied, for example, by video encoder 22, to the pixel to intra-predictively code the pixel (214). This technique may be applied by video encoder 22 for each prediction sample in the set of predication samples and for each pixel in the prediction block.

In some examples, the techniques of the disclosure are independent of the intra-prediction mode. That is, the techniques described herein may be used regardless of the particular intra-prediction mode in which video encoder 22 is operating. In other examples, techniques of the disclosure may apply to mode-dependent intra-prediction. For example, the filters available to select from to filter prediction samples may be based on the intra-prediction mode.

Figure 9:
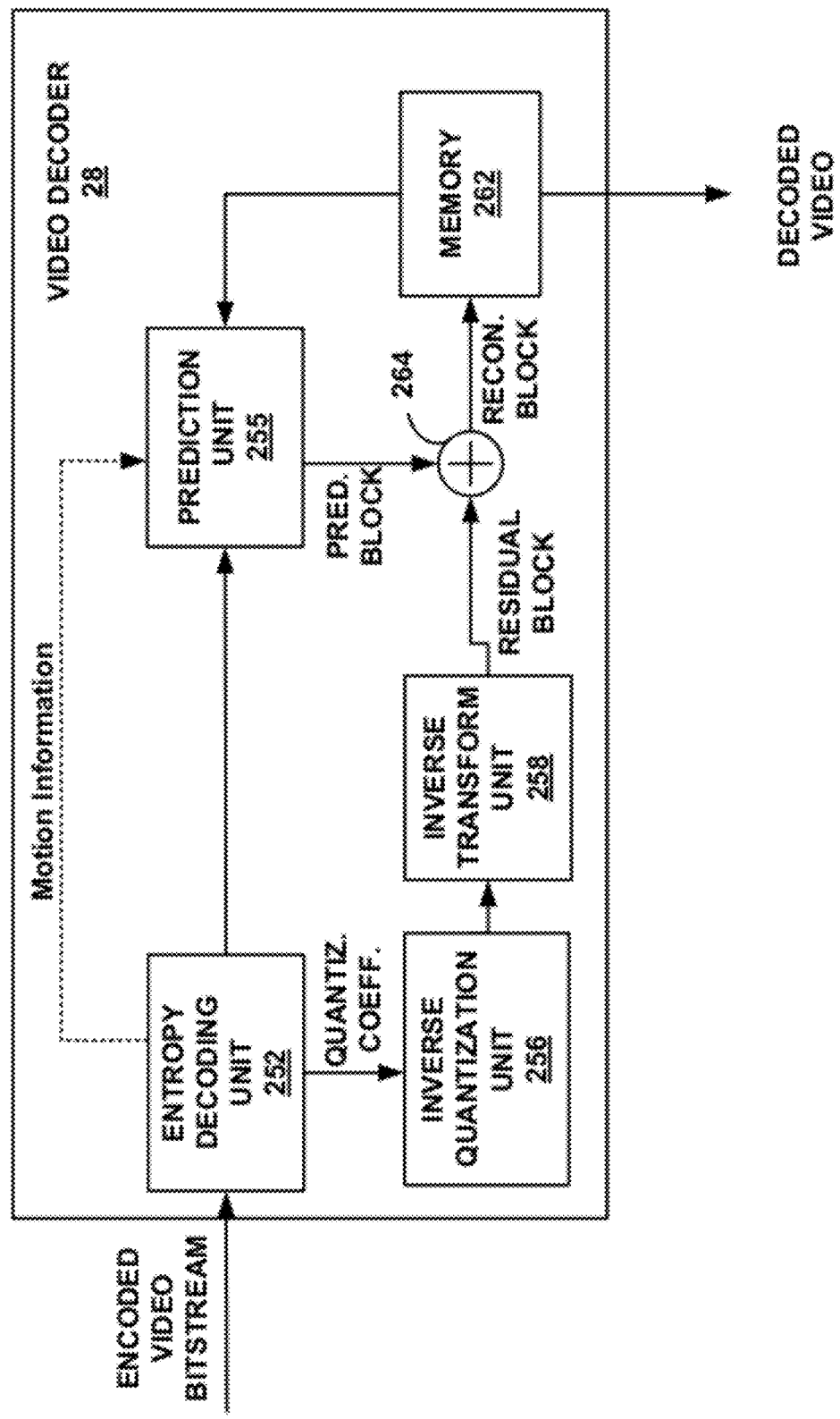
FIG. 9 is a block diagram illustrating an example of the video decoder of FIG. 1 in further detail.

FIG. 9 is a block diagram illustrating an example of the video decoder 28 of FIG. 1 in further detail. Video decoder 28 may decode a video sequence that is encoded in the manner described herein. Video decoder 28 is one example of a specialized video computer device or apparatus referred to herein as a "coder." As shown in FIG. 9, video decoder 28 corresponds to video decoder 28 of destination device 16. However, in other examples, video decoder 28 may correspond to a different device. In further examples, other units (such as, for example, other encoder/decoder (CODECS)) can also perform similar techniques as video decoder 28.

Video decoder 28 may receive an encoded video bitstream, e.g., by streaming, download, access to local storage media, or otherwise. Video decoder 28 includes an entropy decoding unit 252 that entropy decodes the received bitstream to generate quantized coefficients and the prediction syntax elements. The bitstream may include a set of filtered prediction samples, from which the decoder produces a filtered version of the prediction samples according to techniques described herein. In some examples, the bitstream may include a set of unfiltered prediction samples. The bitstream may also include encoded residual coefficients indicative of coded pixels. The prediction syntax elements may include a coding mode, one or more motion vectors, information identifying an interpolation technique used, coefficients for use in interpolation filtering, and/or other information associated with the generation of the prediction block.

The decoder may receive a unfiltered prediction samples and then analyzes local statistics of the prediction samples to produce a filtered versions without referring to any syntax elements communicated by the encoder. However, in one example, video decoder may receive syntax elements identifying a selected filter in the bitstream. The prediction syntax elements, e.g., the coefficients, are forwarded to prediction unit 255. If prediction is used to code the coefficients relative to coefficients of a fixed filter, or relative to one another, prediction unit 255 can decode the syntax elements to define the actual coefficients. Video decoder 28 performs a similar operation to the prediction samples video encoder 22 to determine what filter was used to smooth the filtered prediction samples. Likewise, video decoder 28 performs a similar operation to the residual coefficients to determine whether the corresponding pixel was predicted with the filtered version or unfiltered version of the prediction samples.

If quantization is applied to any of the prediction syntax, inverse quantization unit 256 may also remove such quantization. Filter coefficients, for example, may be predictively coded and quantized according to this disclosure, and in this case, inverse quantization unit 256 may be used by video decoder 28 to predictively decode and de-quantize such coefficients.

Prediction unit 255 may generate prediction data based on the prediction syntax elements and one or more previously decoded blocks that are stored in memory 262, in much the same way as described in detail above with respect to prediction unit 32 of video encoder 22. In particular, prediction unit 55 may determine local statistics of prediction samples or pixels in a coded block. As such, one or more of the techniques of this disclosure may be used by video decoder 28 in generating a prediction block. Prediction unit 255 may include a motion compensation unit that comprises filters used for interpolation and intra-smoothing filters for techniques of this disclosure. The motion compensation component is not shown in FIG. 9 for simplicity and ease of illustration. A plurality of intra-smoothing filters may be accessible to video decoder 28, for example, stored in memory 262. In one example, the plurality of intra-smoothing filters is pre-stored in memory 262. In another example, video encoder 22 may signal the plurality of intra-smoothing filters to video decoder 28.

Inverse quantization unit 256 inverse quantizes, i.e., de-quantizes, the quantized coefficients. The inverse quantization process may be a process defined for H.264 decoding or for any other decoding standard. Inverse transform unit 258 applies an inverse transform, e.g., an inverse DCT or conceptually similar inverse transform process, to the transform coefficients in order to produce residual blocks in the pixel domain. Summer 264 sums the residual block with the corresponding prediction block generated by prediction unit 255 to form a reconstructed version of the original block encoded by video encoder 22. If desired, a deblocking filter may also be applied to filter the decoded blocks in order to remove blockiness artifacts. The decoded video blocks are then stored in memory 262, which provides reference blocks for subsequent motion compensation and also produces decoded video to drive display device (such as display device 30 of FIG. 1).

Figure 10:
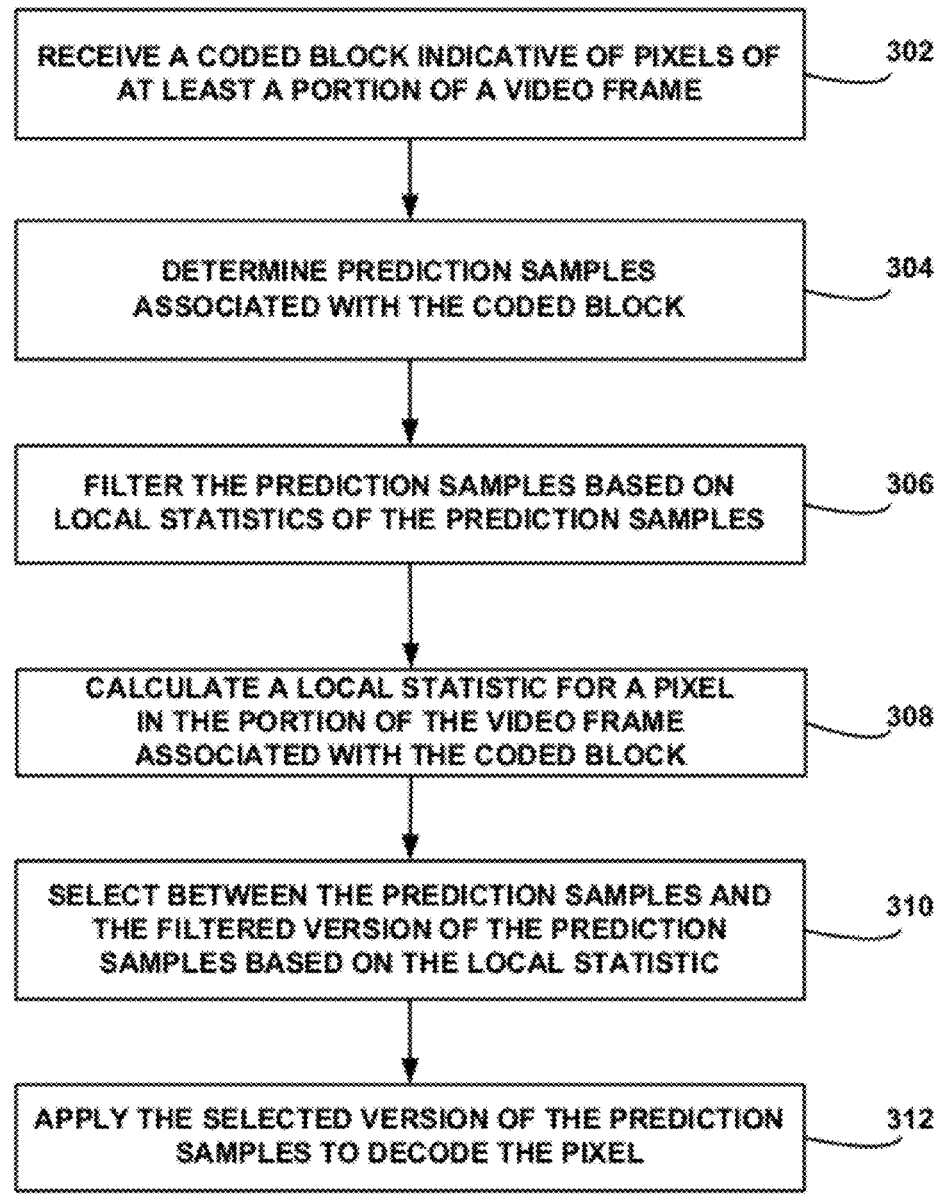
FIG. 10 is a flow diagram illustrating an example operation of a video decoder that decodes a coded block indicative of pixels based on local statistics of the pixels according to techniques of this disclosure.

FIG. 10 is a flow diagram illustrating an example operation of a video decoder that decodes a coded block indicative of pixels based on local statistics of the pixels according to techniques of this disclosure. Thus, the process of FIG. 10 may be considered the reciprocal decoding process to the encoding process of FIG. 3. FIG. 10 will be described from the perspective of video decoder 28 of FIG. 9 although other devices may perform similar techniques.

The video decoder, such as video decoder 28, applies a reciprocal process to reconstruct the original block using reference samples. The reference samples may be filtered or unfiltered prediction samples to predict the pixel in the original block. Also, the prediction samples may be filtered according to techniques described herein. Video decoder 28 receives a coded block indicative of pixels of at least a portion of a video block (302). The coded block may have been encoded according to techniques of this disclosure. The coded block may comprise residual coefficient values in a transform domain. An inverse transform may be performed to recover the residual pixel difference values in the pixel domain.

Video decoder 28 may determine prediction samples associated with the coded block (304). Video decoder 28 may determine prediction samples from previously decoding adjacent reference blocks and receiving unfiltered reference samples. Video decoder 28 may also filter the prediction samples based on local statistics of each prediction sample (306). That is, video decoder 28 generates a filtered set of the prediction samples. The prediction samples may be filtered based on techniques in this disclosure. The prediction samples may be buffered in memory 262. In another example, video decoder 28 may determine a prediction mode in order to know which reference samples were used to produce the predictive block in the encoder (such as video encoder 22). Knowing the prediction mode, video decoder 28 may calculate prediction data for the coded blocks. The version of the prediction samples may have been selected based on one or more local statistics of causal neighbors of the pixel. For example, video decoder 28 may use the decoded reference samples of neighboring blocks to produce a prediction block for a block to be decoded. Video decoder 28 may sum the prediction block with residual data obtained from the encoded bitstream to reconstruct the original block, which could be lossless but may be lossy, e.g., due to quantization of residual data or other video data.

A local statistic may be calculated for each residual coefficient in the coded block indicative of a pixel of the portion of the video frame (308). The local statistic may be one or more local statistics of causal neighbors of the pixel. Based on the one or more local statistics, video decoder 28 selects between a filtered version and an unfiltered version of the prediction samples (310). The selected version of the prediction samples is applied to produce the predictive pixels for the predictive video block (312). The residual data for the block can be summed with the predictive block to reconstruct the original block that was encoded, producing a decoded block. Because video decoder 28 applies the inverse of this process to determine which prediction samples to use, there is no need for any additional signaling.

In another example, a threshold level for the local statistic of the pixel may be set. The prediction samples and a filtered version of the prediction samples are selected based on comparing the local statistic with the threshold level. For example, the unfiltered version of the prediction sample may be selected when a value of the local statistic is below the threshold value, and the filtered version of the prediction sample is selected when the value of the local statistic is equal to or greater than the threshold value. In other examples, the unfiltered version is selected when the local statistic is equal to or greater than the threshold level and the filtered version is selected when the local statistic is less than the threshold level.

In some examples, a second local statistic is determined for the prediction samples. For each prediction sample a filter may be selected from a plurality of filters based on the second local statistic. However, a threshold value may be set for the second local statistic. Selecting a filter from a plurality of filters may be based on the value of the second local statistic as compared with the threshold value. For example, a first filter may be selected when a value of the second local statistic is below the threshold value. A second filter when the value of the second local statistic is equal to or greater than the threshold value.

Techniques of this disclosure improve the intra-prediction performance by introducing intra-smoothing filtering on a pixel-by-pixel basis. A rate distortion analysis does not have to be used to determine whether to use filtered or unfiltered prediction samples to predict a pixel in a prediction block. Additionally, in order to decode the bitstream, a decoder applies the inverse of the process described herein to determine which samples to use. Hence, there is no need for any additional signaling.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of this disclosure have been described. These and other examples are within the scope of the following claims.

The invention claimed is:
1. A method of processing video data, the method comprising:
encoding a first block of video data;

calculating a local statistic for each pixel of a plurality of pixels in a second block of video data to be encoded, wherein the second block of video data forms at least a portion of a video frame, and wherein the local statistic comprises a variance calculated using values of two or more other pixels, the other pixels being included within the second block of video data and being pixels other than the pixel for which the local statistic is calculated;

obtaining prediction samples from the first block of video data;

selecting, for each respective pixel of the plurality of pixels in the second block of video data, between a respective filtered version of a prediction sample of the prediction samples from the first block of video data and a respective unfiltered version of the prediction sample based on the local statistic;

applying, for each respective pixel of the plurality of pixels, the respective selected version of the prediction sample to intra-predict the respective pixel; and encoding the second block of video data using the intra-predicted pixels.

2. The method of claim 1, further comprising:
calculating at least one local statistic for each prediction sample of the prediction samples;
for each prediction sample of the prediction samples, selecting a filter from a plurality of different filters based on the at least one local statistic for each prediction sample; and
applying each selected filter to the corresponding prediction sample to generate the filtered version of the prediction sample.

3. The method of claim 1, wherein calculating the local statistic comprises calculating the local statistic based at least in part on one or more intensity values associated with one or more of the other pixels, or one or more positions associated with one or more of the other pixels.

4. The method of claim 1, wherein calculating the local statistic for each respective pixel of the plurality of pixels in the second block of video data to be encoded further comprises calculating a local statistic for each respective pixel based on at least one local causal neighbor of the respective pixel.

5. The method of claim 4, wherein the at least one local causal neighbor of the respective pixel comprises four pixels adjacent to the respective pixel.

6. The method of claim 1, further comprising:
determining a threshold value for the local statistic, and wherein selecting between a filtered version of a prediction sample of the prediction samples and an unfiltered version of the prediction sample further comprises:
selecting the unfiltered version of the prediction sample when a value of the local statistic is below the threshold value; and
selecting the filtered version of the prediction sample when the value of the local statistic is equal to or greater than the threshold value.

7. A device for encoding data, comprising:
a memory storing video data; and
one or more processors configured to:
encode a first block of video data;
calculate a local statistic for each pixel in a second block of video data to be encoded of a plurality of pixels, wherein the second block of video data forms at least a portion of a video frame, and wherein the local statistic comprises a variance calculated using values of two or more other pixels, the other pixels being included within the second block of video data and being pixels other than the pixel for which the local statistic is calculated;

obtain prediction samples from the first block of video data;

select, for each respective pixel of the plurality of pixels in the second block of video data, between a filtered version of a prediction sample of the prediction samples from the first block of video data and a respective unfiltered version of the prediction sample based on the local statistic;

apply, for each respective pixel of the plurality of pixels, the respective selected version of the prediction sample to intra-predict the respective pixel; and encode the second block of video data to be encoded using the intra-predicted pixels.

8. The device of claim 7, wherein the one or more processors are further configured to calculate at least one local statistic for each prediction sample of the prediction samples, select a filter from a plurality of different filters based on the at least one local statistic for each prediction sample of the prediction samples, and apply each selected filter to the corresponding prediction sample to generate the filtered version of the prediction sample.

9. The device of claim 8, wherein, to calculate the local statistic, the one or more processors are configured to calculate the local statistic based at least in part one or more intensity values associated with one or more of the other pixels, or one or more positions associated with one or more of the other pixels.

10. The device of claim 7, wherein, to calculate the local statistic for each respective pixel of the plurality of pixels in the second block of video data to be encoded, the one or more processors are configured to calculate a local statistic for each respective pixel based on at least one local causal neighbor of the respective pixel.

11. The device of claim 10, wherein the at least one local causal neighbor of the respective pixel comprises four pixels adjacent to the respective pixel.

12. The device of claim 7, wherein the one or more processors are further configured to determine a threshold value for the local statistic, and wherein, to select between a filtered version of a prediction sample of the prediction samples and an unfiltered version of the prediction sample, the one or more processors are configured to select the unfiltered version of the prediction sample when a value of the local statistic is below the threshold value and select the filtered version of the prediction sample when the value of the local statistic is equal to or greater than the threshold value.

13. A non-transitory computer-readable storage medium having stored thereon instructions that, when executed, cause a processor of a video encoding device to:
encode a first block of video data;
calculate a local statistic for each pixel of a plurality of pixels in a second block of video data to be encoded, wherein the second block of video data forms at least a portion of a video frame, and wherein the local statistic comprises a variance calculated using values of two or more other pixels, the other pixels being included within the second block of video data to be encoded and being pixels other than the pixel for which the local statistic is calculated;

obtain prediction samples from the first block of video data;

select, for each respective pixel of the plurality of pixels in the second block of video data, between a respective filtered version of a prediction sample of the prediction samples from the first block of video data and a respective unfiltered version of the prediction sample based on the local statistic;

apply, for each respective pixel of the plurality of pixels, the respective selected version of the prediction sample to intra-predict the respective pixel; and encode the second block of video data to be encoded using the intra-predicted pixels.

14. The non-transitory computer-readable storage medium of claim 13, wherein the instructions further cause the processor of the video encoding device to:

calculate at least one local statistic for each prediction sample of the prediction samples;

for each prediction sample of the prediction samples, select a filter from a plurality of different filters based on the at least one local statistic for each prediction sample; and apply each selected filter to the corresponding prediction sample to generate the filtered version of the prediction sample.

15. The non-transitory computer-readable storage medium of claim 13, wherein the instructions further cause the processor of the video encoding device to calculate the local statistic based at least in part one or more intensity values associated with one or more of the other pixels, or one or more positions associated with one or more of the other pixels.

16. The non-transitory computer-readable storage medium of claim 13, wherein the instructions further cause the processor of the video encoding device to calculate a local statistic for each respective pixel based on at least one local causal neighbor of the respective pixel.

17. The non-transitory computer-readable storage medium of claim 16, wherein the at least one local causal neighbor of the respective pixel comprises four pixels adjacent to the respective pixel.

18. The non-transitory computer-readable storage medium of claim 13, wherein the instructions further cause the processor of the video encoding device to:

determine a threshold value for the local statistic, and wherein, to select between a filtered version of a prediction sample of the prediction samples and an unfiltered version of the prediction sample, the instructions further cause the processor of the video encoding device to:

select the unfiltered version of the prediction sample when a value of the local statistic is below the threshold value; and select the filtered version of the prediction sample when the value of the local statistic is equal to or greater than the threshold value.

19. A device for processing video data, comprising:
means for encoding a first block of video data;
means for calculating a local statistic for each pixel of a plurality of pixels in a second block of video data to be encoded, wherein the second block of video data forms at least a portion of a video frame, and wherein the local statistic comprises a variance calculated using values two or more other pixels, the other pixels being included within the second block of video data and being pixels other than the pixel for which the local statistic is calculated;
means for obtaining prediction samples from the first block of video data;
means for selecting, for each respective pixel of the plurality of pixels in the second block of video data, between a respective filtered version of a prediction sample of the prediction samples from the first block of video data and a respective unfiltered version of the prediction sample based on the local statistic;
means for applying, for each respective pixel of the plurality of pixels, the respective selected version of the prediction sample to intra-predict the respective pixel; and
means for encoding the second block of video data to be encoded using the intra-predicted pixels.

20. The device of claim 19, further comprising:
means for calculating at least one local statistic for each prediction sample of the prediction samples;
for each prediction sample of the prediction samples, means for selecting a filter from a plurality of different filters based on the at least one local statistic for each prediction sample; and
means for applying each selected filter to the corresponding prediction sample to generate the filtered version of the prediction sample.

21. The device of claim 19, wherein the means for calculating the local statistic comprises means for calculating the local statistic based at least in part one or more intensity values associated with one or more of the other pixels, or one or more positions associated with one or more of the other pixels.

22. The device of claim 19, wherein the means for calculating the local statistic for each respective pixel of the plurality of pixels in the second block of video data further comprises means for calculating a local statistic for each respective pixel based on at least one local causal neighbor of the respective pixel.

23. The device of claim 19, further comprising:
means for determining a threshold value for the local statistic, and
wherein means for selecting between a filtered version of a prediction sample of the prediction samples and an unfiltered version of the prediction sample further comprises:
means for selecting the unfiltered version of the prediction sample when a value of the local statistic is below the threshold value; and
means for selecting the filtered version of the prediction sample when the value of the local statistic is equal to or greater than the threshold value.

24. A method of processing video data, the method comprising:
decoding a first block of video data;
decoding a portion of a second block of video data;
determining prediction samples of the first block of video data for the second block of video data;
calculating a local statistic for each pixel of a plurality of pixels in the second block of video data, wherein the local statistic comprises a variance calculated using values of two or more other pixels, the other pixels being included within the portion of the second block of video data and being pixels other than the pixel for which the local statistic is calculated;
selecting, for each respective pixel of the plurality of pixels, between the prediction samples of the first block of video data and a filtered version of the prediction samples based on the local statistic;
applying, for each respective pixel of the plurality of pixels, the respective selected version of the prediction samples to intra-predict the respective pixel of the plurality of pixels in the second block of video data; and decoding the second block of video data using the intra-predicted pixels.

25. The method of claim 24, further comprising:
determining a threshold value for the local statistic, and
wherein selecting between the prediction samples and a filtered version of the prediction samples based on the local statistic further comprises:
  selecting the unfiltered version of the prediction sample when a value of the local statistic is below the threshold value; and
  selecting the filtered version of the prediction sample when the value of the local statistic is equal to or greater than the threshold value.

26. The method of claim 24, wherein the local statistic is a first local statistic, the method further comprising:
  for each prediction sample, calculating a second local statistic for a prediction sample of the prediction samples;
  for each prediction sample, selecting a filter from a plurality of different filters based on the second local statistic for each prediction sample; and
  applying each selected filter to the corresponding prediction sample to generate the filtered version of the prediction sample.

27. The method of claim 26, further comprising:
determining a threshold value for the second local statistic, and
wherein selecting a filter from a plurality of different filters based on the second local statistic for each prediction sample further comprises:
  selecting a first filter when a value of the second local statistic is below the threshold value; and
  selecting a second filter when the value of the second local statistic is equal to or greater than the threshold value.

28. The method of claim 24, wherein calculating the local statistic comprises calculating the local statistic based at least in part on one or more intensity values associated with one or more of the other pixels, or one or more positions associated with one or more of the other pixels.

29. The method of claim 24, wherein calculating the local statistic for each respective pixel of the plurality of pixels in the second block of video data further comprises calculating a local statistic for each respective pixel of at least one local causal neighbor of the respective pixel.

30. The method of claim 29, wherein the at least one local causal neighbor of the respective pixel comprises four pixels adjacent to the respective pixel.

31. A device for decoding data, comprising:
a memory storing video data; and
one or more processors configured to:
decode a first block of video data;
decode a portion of a second block of video data;
determine prediction samples of the first block of video data for the second block of video data;
calculate a local statistic for each pixel of a plurality of pixels in the second block of video data, wherein the local statistic comprises a variance calculated using values of two or more other pixels, the other pixels being included within the portion of the second block of video data and being pixels other than the pixel for which the local statistic is calculated;
select, for each respective pixel of the plurality of pixels, between the prediction samples of the first block of video data and a filtered version of the prediction samples based on the local statistic;
apply, for each respective pixel of the plurality of pixels, the respective selected version of the prediction samples to intra-predict the respective pixel of the plurality of pixels in the second block of video data; and
decode the second block of video data using the intra-predicted pixels.

32. The device of claim 31, wherein the one or more processors are further configured to determine a threshold value for the local statistic, and wherein, to select between the prediction samples and a filtered version of the prediction samples based on the local statistic, the one or more processors are further configured to select the unfiltered version of the prediction sample when a value of the local statistic is below the threshold value, and select the filtered version of the prediction sample when the value of the local statistic is equal to or greater than the threshold value.

33. The device of claim 31, wherein the local statistic is a first local statistic, and wherein the one or more processors are further configured to calculate a second local statistic for a prediction sample of the prediction samples for each prediction sample, select a filter from a plurality of different filters based on the second local statistic for each prediction sample, and apply each selected filter to the corresponding prediction sample to generate the filtered version of the prediction sample.

34. The device of claim 33, wherein the one or more processors are further configured to determine a threshold value for the second local statistic, and wherein, to select a filter from a plurality of different filters based on the second local statistic for each prediction sample, the one or more processors are further configured to select a first filter when a value of the second local statistic is below the threshold value, and select a second filter when the value of the second local statistic is equal to or greater than the threshold value.

35. The device of claim 31, wherein the local statistic is calculated based at least in part on one or more intensity values associated with one or more of the other pixels, or one or more positions associated with one or more of the other pixels.

36. The device of claim 31, wherein the local statistic for each respective pixel of the plurality of pixels in the second block of video data further comprises a local statistic for each respective pixel of at least one local causal neighbor of the respective pixel.

37. The device of claim 36, wherein the at least one local causal neighbor of the respective pixel comprises four pixels adjacent to the respective pixel.

38. A non-transitory computer-readable storage medium having stored thereon instructions that, when executed, cause a processor of a video decoding device to:
decode a first block of video data;
decode a portion of a second block of video data;
determine prediction samples of the first block of video data for the second block of video data;
calculate a local statistic for each pixel of a plurality of pixels in the second block of video data, wherein the local statistic comprises a variance calculated using values of two or more other pixels, the other pixels being included within the portion of the second block of video data and being pixels other than the pixel for which the local statistic is calculated;
select, for each respective pixel of the plurality of pixels, between the prediction samples of the first block of video data and a filtered version of the prediction samples based on the local statistic;
apply, for each respective pixel of the plurality of pixels, the respective selected version of the prediction samples to intra-predict the respective pixel of the plurality of pixels in the second block of video data; and decode the second block of video data using the intra-predicted pixels.

39. The non-transitory computer-readable storage medium of claim 38, wherein the instructions further cause the processor of the video decoding device to:

determine a threshold value for the local statistic, and wherein, to select between the prediction samples and a filtered version of the prediction samples based on the local statistic, the instructions cause the processor of the video decoding device to:

select the unfiltered version of the prediction sample when a value of the local statistic is below the threshold value; and select the filtered version of the prediction sample when the value of the local statistic is equal to or greater than the threshold value.

40. The non-transitory computer-readable storage medium of claim 38, wherein the instructions further cause the processor of the video decoding device to:

for each prediction sample, calculate a second local statistic for a prediction sample of the prediction samples;

for each prediction sample, select a filter from a plurality of different filters based on the second local statistic for each prediction sample; and apply each selected filter to the corresponding prediction sample to generate the filtered version of the prediction sample.

41. The non-transitory computer-readable storage medium of claim 40, wherein the instructions further cause the processor of the video decoding device to:

determine a threshold value for the second local statistic, and wherein, to select a filter from a plurality of different filters based on the second local statistic for each prediction sample, the instructions further cause the processor of the video decoding device to:

select a first filter when a value of the second local statistic is below the threshold value; and select a second filter when the value of the second local statistic is equal to or greater than the threshold value.

42. The non-transitory computer-readable storage medium of claim 38, wherein the local statistic is calculated based at least in part on one or more intensity values associated with one or more of the other pixels, or one or more positions associated with one or more of the other pixels.

43. The non-transitory computer-readable storage medium of claim 38, wherein the local statistic for each respective pixel of the plurality of pixels in the second block of video data further comprises a local statistic for each respective pixel of at least one local causal neighbor of the respective pixel.

44. The non-transitory computer-readable storage medium of claim 43, wherein the at least one local causal neighbor of the respective pixel comprises four pixels adjacent to the respective pixel.

45. A device for processing video data, comprising:

means for decoding a first block of video data;

means for decoding a portion of a second block of video data;

means for determining prediction samples of the first block of video data for the second block of video data;

means for calculating a local statistic for each pixel of a plurality of pixels in the second block of video data, wherein the local statistic comprises a variance calculated using values of two or more other pixels, the other pixels being included within the portion of the second block of video data and being pixels other than the pixel for which the local statistic is calculated;

means for selecting, for each respective pixel of the plurality of pixels, between the prediction samples of the first block of video data and a filtered version of the prediction samples based on the local statistic;

means for applying, for each respective pixel of the plurality of pixels, the respective selected version of the prediction samples to intra-predict the respective pixel of the plurality of pixels in the second block of video data; and means for decoding the second block of video data using the intra-predicted pixels.

46. The device of claim 45, further comprising:

means for determining a threshold value for the local statistic, and wherein the means for selecting between the prediction samples and a filtered version of the prediction samples based on the local statistic further comprises:

means for selecting the unfiltered version of the prediction sample when a value of the local statistic is below the threshold value; and means for selecting the filtered version of the prediction sample when the value of the local statistic is equal to or greater than the threshold value.

47. The device of claim 45, wherein the local statistic is a first local statistic, and further comprising:

for each prediction sample, means for calculating a second local statistic for a prediction sample of the prediction samples;

for each prediction sample, means for selecting a filter from a plurality of different filters based on the second local statistic for each prediction sample; and means for applying each selected filter to the corresponding prediction sample to generate the filtered version of the prediction sample.

48. The device of claim 47, further comprising:

means for determining a threshold value for the second local statistic, and wherein the means for selecting a filter from a plurality of different filters based on the second local statistic for each prediction sample further comprises:

means for selecting a first filter when a value of the second local statistic is below the threshold value; and means for selecting a second filter when the value of the second local statistic is equal to or greater than the threshold value.

49. The device of claim 45, wherein the means for calculating the local statistic comprises means for calculating the local statistic based at least in part on one or more intensity values associated with one or more of the other pixels, or one or more positions associated with one or more of the other pixels.

50. The device of claim 45, wherein the means for calculating the local statistic for each respective pixel of the plurality of pixels in the second block of video data further comprises means for calculating a local statistic for each respective pixel of at least one local causal neighbor of the respective pixel.

51. The device of claim 50, wherein the at least one local causal neighbor of the respective pixel comprises four pixels adjacent to the respective pixel.

52. The method of claim 1, wherein selecting between the respective filtered version of the prediction sample of the prediction samples and the respective unfiltered version of the prediction sample comprises selecting one of the plurality of prediction samples or the plurality of filtered prediction samples based on the local statistic for the respective pixel within the second block of video data.

53. The method of claim 1, further comprising:
calculating at least one local statistic for each prediction sample of the prediction samples;
for each prediction sample of the prediction samples, selecting a filter from a plurality of different filters based on the at least one local statistic for each prediction sample; and
applying each selected filter to the corresponding prediction sample to generate the filtered version of the prediction sample,
wherein the at least one local statistic for each prediction sample comprises at least one of a local gradient, variance, intensity value, or position associated with the corresponding prediction sample.

54. The device of claim 7, wherein the one or more processors are further configured to select between the respective filtered version of a prediction sample of the prediction samples and the respective unfiltered version of the prediction sample by at least selecting one of the plurality of prediction samples or the plurality of filtered prediction samples based on the local statistic for the respective pixel within the second block of video data.

55. The device of claim 7, wherein the one or more processors are further configured to:
calculate at least one local statistic for each prediction sample of the prediction samples;
select, for each prediction sample of the prediction samples, a filter from a plurality of different filters based on the at least one local statistic for each prediction sample; and
apply each selected filter to the corresponding prediction sample to generate the filtered version of the prediction sample,
wherein the at least one local statistic for each prediction sample comprises at least one of a local gradient, variance, intensity value, or position associated with the corresponding prediction sample.

56. The computer-readable storage medium of claim 13, wherein the instructions further cause the video encoding device to select between the respective filtered version of a prediction sample of the prediction samples and the respective unfiltered version of the prediction sample by at least selecting one of the plurality of prediction samples or the plurality of filtered prediction samples based on the local statistic for the respective pixel within the second block of video data.

57. The computer-readable storage medium of claim 13, wherein the instructions further cause the processor of the video encoding device to:
calculate at least one local statistic for each prediction sample of the prediction samples;
select, for each prediction sample of the prediction samples, a filter from a plurality of different filters based on the at least one local statistic for each prediction sample; and
apply each selected filter to the corresponding prediction sample to generate the filtered version of the prediction sample,
wherein the at least one local statistic for each prediction sample comprises at least one of a local gradient, variance, intensity value, or position associated with the corresponding prediction sample.

58. The device of claim 19, wherein the means for selecting between a filtered version of the respective prediction sample of the prediction samples and the respective unfiltered version of the prediction sample comprises means for selecting one of the plurality of prediction samples and the plurality of filtered prediction samples based on the local statistic for the respective pixel within the second block of video data.

59. The device of claim 19, further comprising:
means for calculating at least one local statistic for each prediction sample of the prediction samples;
means for selecting, for each prediction sample of the prediction samples, a filter from a plurality of different filters based on the at least one local statistic for each prediction sample; and
means for applying each selected filter to the corresponding prediction sample to generate the filtered version of the prediction sample,
wherein the at least one local statistic for each prediction sample comprises at least one of a local gradient, variance, intensity value, or position associated with the corresponding prediction sample.

60. The method of claim 24, wherein selecting between the respective filtered version of the prediction sample of the prediction samples and the respective unfiltered version of the prediction sample comprises selecting one of the plurality of prediction samples or the plurality of filtered prediction samples based on the local statistic for the respective pixel within the second block of video data.

61. The method of claim 24, further comprising:
calculating at least one local statistic for each prediction sample of the prediction samples;
for each prediction sample of the prediction samples, selecting a filter from a plurality of different filters based on the at least one local statistic for each prediction sample; and
applying each selected filter to the corresponding prediction sample to generate the filtered version of the prediction sample,
wherein the at least one local statistic for each prediction sample comprises at least one of a local gradient, variance, intensity value, or position associated with the corresponding prediction sample.

62. The device of claim 31, wherein the one or more processors are further configured to select between the respective filtered version of the prediction sample of the prediction samples and the respective unfiltered version of the prediction sample by at least selecting one of the plurality of prediction samples or the plurality of filtered prediction samples based on the local statistic for the respective pixel within the second block of video data.

63. The device of claim 31, wherein the one or more processors are further configured to:
calculate at least one local statistic for each prediction sample of the prediction samples;
select, for each prediction sample of the prediction samples, a filter from a plurality of different filters based on the at least one local statistic for each prediction sample; and
apply each selected filter to the corresponding prediction sample to generate the filtered version of the prediction sample,
wherein the at least one local statistic for each prediction sample comprises at least one of a local gradient, variance, intensity value, or position associated with the corresponding prediction sample.

64. The computer-readable storage medium of claim 38, wherein the instructions further cause the processor of the video decoding device to select one of the plurality of prediction samples the plurality of filtered prediction samples based on the local statistic for the respective pixel within the second block of video data.

65. The computer-readable storage medium of claim 38, wherein the instructions further cause the processor of the video decoding device to:
- calculate at least one local statistic for each prediction sample of the prediction samples;
- select, for each prediction sample of the prediction samples, a filter from a plurality of different filters based on the at least one local statistic for each prediction sample; and
- apply each selected filter to the corresponding prediction sample to generate the filtered version of the prediction sample,
- wherein the at least one local statistic for each prediction sample comprises at least one of a local gradient, variance, intensity value, or position associated with the corresponding prediction sample.

66. The device of claim 45, further comprising means for selecting one of the plurality of prediction samples or the plurality of filtered prediction samples based on the local statistic for the respective pixel within the second block of video data.

67. The device of claim 45, further comprising:
- means for calculating at least one local statistic for each prediction sample of the prediction samples;
- means for selecting, for each prediction sample of the prediction samples, a filter from a plurality of different filters based on the at least one local statistic for each prediction sample; and
- means for applying each selected filter to the corresponding prediction sample to generate the filtered version of the prediction sample,
- wherein the at least one local statistic for each prediction sample comprises at least one of a local gradient, variance, intensity value, or position associated with the corresponding prediction sample.

68. The method of claim 1, further comprising:
- storing the video data in a memory of a wireless communication device;
- processing the video data on one or more processors of the wireless communication device; and
- transmitting the video data from a transmitter of the wireless communication device.

69. The method of claim 68, wherein the wireless communication device comprises a telephone handset and wherein transmitting the video data at the transmitter of the wireless communication device comprises modulating, according to a wireless communication standard, a signal comprising the video data.

70. The device of claim 7, wherein the device comprises a wireless communication device, further comprising a transmitter configured to transmit encoded video data.

71. The device of claim 70, wherein the wireless communication device comprises a telephone handset and wherein the transmitter is configured to modulate, according to a wireless communication standard, a signal comprising the encoded video data.

72. The method of claim 24, further comprising:
- receiving the video data at a receiver of a wireless communication device;
- storing the video data in a memory of the wireless communication device; and
- processing the video data on one or more processors of the wireless communication device.

73. The method of claim 72, wherein the wireless communication device comprises a telephone handset and wherein receiving the video data at the receiver of the wireless communication device comprises demodulating, according to a wireless communication standard, a signal comprising the video data.

74. The device of claim 31, wherein the device comprises a wireless communication device, the device further comprising a receiver configured to receive encoded video data.

75. The device of claim 74, wherein the wireless communication device comprises a telephone handset and wherein the receiver is configured to demodulate, according to a wireless communication standard, a signal comprising the encoded video data.

* * * * *